US009577889B1

(12) United States Patent
Dumitrascu et al.

(10) Patent No.: US 9,577,889 B1
(45) Date of Patent: Feb. 21, 2017

(54) MANAGING PAGE-LEVEL USAGE DATA

(71) Applicant: Amazon Technologies, Inc., Reno, NV (US)

(72) Inventors: Aurel Dumitrascu, Moldavia (RO); Alexandru Burciu, Moldavia (RO); Sebastian Kohlmeier, Mountlake Terrace, WA (US); Alexandru Tronciu, Neamt (RO)

(73) Assignee: Amazon Technologies, Inc., Seattle, WA (US)

( * ) Notice: Subject to any disclaimer, the term of this patent is extended or adjusted under 35 U.S.C. 154(b) by 342 days.

(21) Appl. No.: 13/753,500

(22) Filed: Jan. 29, 2013

(51) Int. Cl.
*G06F 15/177* (2006.01)
*H04L 12/24* (2006.01)

(52) U.S. Cl.
CPC .................... *H04L 41/22* (2013.01)

(58) Field of Classification Search
CPC ...... G06F 15/177; B60W 10/06; B60W 20/00; B60W 2540/10; B60W 2540/30; B60W 30/182; B60W 10/02; B60W 10/08; B60W 10/10; B60W 2710/105; B60W 2720/106; B60W 30/19; B60W 10/11; B60W 2050/0078; H04W 4/14; H04W 40/02; H04W 12/02; H04W 88/02; H04W 12/06; G06Q 20/387; G06Q 30/0201; G06Q 10/06311; G06Q 30/0207; G06Q 30/0601; G06Q 30/0645; G06Q 10/06; G06Q 10/10; G06Q 30/0241; G06Q 10/063; G06Q 20/0652
See application file for complete search history.

(56) References Cited

U.S. PATENT DOCUMENTS

| 6,529,910 | B1 | 3/2003 | Fleskes |
| 6,836,774 | B2 | 12/2004 | Melbin |
| 7,165,105 | B2 | 1/2007 | Reiner et al. |
| 7,287,227 | B2 | 10/2007 | Ries |
| 7,559,016 | B1 | 7/2009 | Rakowski |
| 7,818,419 | B1 | 10/2010 | McAllister et al. |

(Continued)

OTHER PUBLICATIONS

Carreon, Arlo, Javascript Image Beacons for Tracking User Interactions, downloaded on Nov. 27, 2012 from http://www.arlocarreon.com/blog/javascript/javascript-image-beacons-for-tracking-user-interactions/.

(Continued)

*Primary Examiner* — Di Xiao
(74) *Attorney, Agent, or Firm* — Knobbe, Martens, Olson & Bear, LLP

(57) ABSTRACT

Systems and methods are disclosed which facilitate management and monitoring of page-level usage data. Specifically, a client computing device may retrieve content from a remote system for local display. A local interaction monitoring component may monitor local interaction with the content, and transmit local interaction information to the remote system. In one embodiment, interaction may be monitored with regard to predefined portions of the content. In another embodiment, interaction may be transmitted to the remote server for processing, in order to generate page-level usage data. In still more embodiments, page level-usage data may be processed or formatted in order to facilitate ease of retrieval and display. In yet more embodiments, the remote system may enable clients, such as administrators, to view aggregate page-level usage data why viewing a corresponding content.

22 Claims, 13 Drawing Sheets

(56) References Cited

U.S. PATENT DOCUMENTS

| | | |
|---|---|---|
| 8,150,943 B2 | 4/2012 | Chace |
| 8,171,156 B2 | 5/2012 | Audenaert et al. |
| 8,185,608 B1 | 5/2012 | York et al. |
| 8,266,281 B1 | 9/2012 | Carlson et al. |
| 8,346,921 B1 | 1/2013 | Goodspeed et al. |
| 8,352,609 B2 | 1/2013 | Maclinovsky et al. |
| 8,375,305 B1 | 2/2013 | Strand |
| 8,379,053 B1 | 2/2013 | Phillips et al. |
| 8,473,347 B1 | 6/2013 | Koningstein |
| 8,700,464 B1 | 4/2014 | McAllister et al. |
| 9,172,482 B2 | 10/2015 | Sofos et al. |
| 2002/0065802 A1 | 5/2002 | Uchiyama |
| 2002/0099832 A1 | 7/2002 | Yaegerman et al. |
| 2002/0147805 A1 | 10/2002 | Leshem et al. |
| 2003/0086098 A1 | 5/2003 | Sesek |
| 2003/0177175 A1 | 9/2003 | Worley |
| 2004/0249938 A1* | 12/2004 | Bunch ............................ 709/224 |
| 2005/0033657 A1 | 2/2005 | Herrington et al. |
| 2005/0114508 A1 | 5/2005 | DeStefano |
| 2005/0132018 A1 | 6/2005 | Milic-Frayling et al. |
| 2005/0246651 A1 | 11/2005 | Krzanowski |
| 2005/0256956 A1 | 11/2005 | Littlefield et al. |
| 2005/0283408 A1 | 12/2005 | Kassan |
| 2007/0055766 A1 | 3/2007 | Petropoulakis et al. |
| 2007/0101061 A1 | 5/2007 | Baskaran |
| 2007/0113167 A1* | 5/2007 | Kundu ........................ 715/501.1 |
| 2007/0124288 A1 | 5/2007 | Swanson et al. |
| 2008/0182621 A1 | 7/2008 | Morman |
| 2008/0228910 A1 | 9/2008 | Petri |
| 2009/0234941 A1 | 9/2009 | Ammerlaan et al. |
| 2009/0271514 A1 | 10/2009 | Thomas et al. |
| 2009/0320056 A1 | 12/2009 | Wu et al. |
| 2010/0095208 A1 | 4/2010 | White |
| 2010/0223126 A1 | 9/2010 | Tung et al. |
| 2010/0228822 A1 | 9/2010 | Cohen et al. |
| 2010/0251128 A1 | 9/2010 | Cordasco |
| 2010/0268694 A1* | 10/2010 | Denoue et al. ................ 707/693 |
| 2011/0047208 A1* | 2/2011 | Kudou ................ G06F 11/3409 709/203 |
| 2011/0078411 A1 | 3/2011 | Maclinovsky |
| 2011/0093511 A1 | 4/2011 | Tapper et al. |
| 2011/0270685 A1 | 11/2011 | Marks et al. |
| 2012/0023156 A1* | 1/2012 | Ueda ....................... H04L 67/02 709/203 |
| 2012/0110435 A1 | 5/2012 | Green |
| 2012/0303552 A1 | 11/2012 | Zayas et al. |
| 2013/0097522 A1 | 4/2013 | Devries |
| 2013/0346533 A1 | 12/2013 | Agrawal et al. |
| 2014/0149586 A1 | 5/2014 | Clapp et al. |

OTHER PUBLICATIONS

Rubenking, Control Internet Explorer's Window Size, pcmag.com, Aug. 19, 2003 (1pg).

U.S. Appl. No. 13/753,487, Managing Page-Level Usage Data, filed Jan. 29, 2013.

U.S. Appl. No. 13/753,498, Managing Page-Level Usage Data, filed Jan. 29, 2013.

U.S. Appl. No. 13/753,480, Managing Page-Level Usage Data, filed Jan. 29, 2013.

U.S. Appl. No. 13/830,609, Managing Feature Usage Data, filed Mar. 14, 2013.

U.S. Appl. No. 13/830,775, Managing Feature Usage Data, filed Mar. 14, 2013.

* cited by examiner

MANAGING PAGE-LEVEL USAGE DATA

BACKGROUND

Generally described, computing devices utilize a communication network, or a series of communication networks, to exchange data. Companies and organizations operate computer networks that interconnect a number of computing devices to support operations or provide services to third parties. In order to provide such services, or information regarding such services, companies, organizations, or other parties may provide content, such as display pages (e.g., web pages) to client computing devices over the communication network. Illustratively, display pages may be provided that describe products or services that are available from the companies or organizations.

Clients, utilizing client computing devices, may thereafter access, view, and interact with the provided content. Such access, viewing, and interaction may be facilitated by various components of a client computing device, such as a web browser. Differences between web browsers, as well as their interpretation of provided content, may affect the manner in which the content is displayed to a client. Further, display pages may include a large amount of potentially diverse content, such as descriptive information, images, pricing, recommendations, ratings, or reviews. In some instances, after display of content by a client computing device, interaction with the content by the client may require continued communication with one or more remote computing devices (e.g., a web server hosting the content). In other instances, a client may locally interact with displayed content without communicating with a remote computing device.

DETAILED DESCRIPTION

Figure 1:
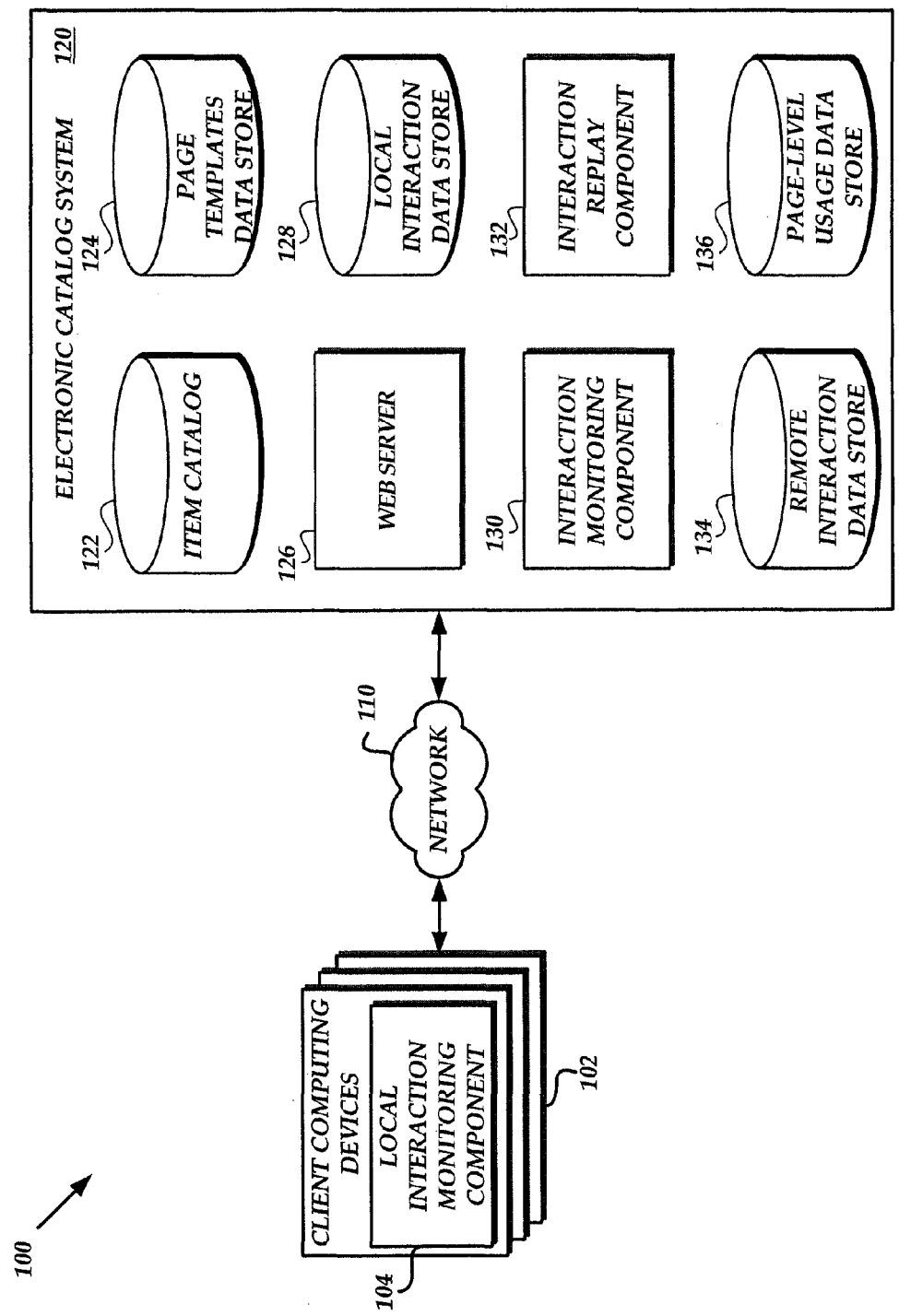
FIG. 1 is a block diagram depicting an illustrative operating environment in which an electronic catalog system enables customers to display content regarding a plurality of items, and manages page-level usage data of the displayed content.

Generally described, aspects of the present disclosure relate to managing page-level usage data associated with content provided to client computing devices. Page-level usage data may generally refer to usage information corresponding to interaction within an item of content, as opposed to mere acquisition of content. In general, page-level usage data may include information corresponding to local interaction with a content item (e.g., interaction occurring within the context of a local computing device outputting the content), information corresponding to remote interaction (e.g., interaction occurring between a local computing device outputting the content and a remote computing device), or both. Examples of page-level usage data may include, but are not limited to, whether a portion of a content item was viewed by a client, how long the portion was viewed by a client, whether a portion was viewed for at least a threshold amount of time (which may hereinafter be referred to as an "impression"), and the movement speed of a client across a portion of a content item (e.g., a scroll speed). Page-level usage data may be utilized, for example, by providers of a content item in order to determine how end users interact with the content item. However, due to the local nature of at least a portion of such interaction, accurate page-level usage data may be difficult to obtain by providers of content. Accordingly, aspects of the present disclosure relate to monitoring local interaction with content at a client computing device and utilizing local interaction information (with or without additional information) to generate page-level usage data. Aspects of the present disclosure further relate to processing page-level usage data to facilitate rapid access to data, as well as to managing the output of page-level usage data to client devices (such as administrator devices).

Though description is made throughout regarding monitoring of interaction with content items, aspects of the present disclosure are not intended to indicate that such monitoring would occur without the knowledge or consent of clients. Rather, in embodiments of the present disclosure, clients may be required to provide consent for monitoring of local interaction information (e.g., via explicit consent, acceptance of terms of service, etc.). Moreover, aspects of the present disclosure may relate to aggregating page-level usage data, such that data corresponding to any individual client is not stored or disclosed. Accordingly, providers of content may be enabled to gather additional information regarding the manners in which clients consume content while still maintaining the client's privacy.

Specifically, a number of client computing devices may include a local interaction monitoring component configured to monitor local interaction with a content item provided by a remote computing device. Illustratively, the remote computing device may be associated with a network-based service, such as an electronic catalog system offering items for acquisition. The content item may correspond to a web page provided by the electronic catalog system, such as a detail page for an item offered for acquisition on the electronic catalog system. In general, the client computing device may receive the detail page and display at least a portion of the detail page to a client. However, the displayed portion of the detail page may vary based on the configuration of the client computing device as well as the content of the detail page. Accordingly, the electronic catalog system may be unable to determine which portion of the detail page has been displayed. Moreover, the client computing device may generally interact with the detail page without communicating such interaction to the electronic catalog system. For example, the client computing device may display various portions of the detail page according to a client's commands (e.g., scrolling the detail page, minimizing or maximizing portions of the detail page, etc.). One skilled in the art will appreciate that multiple aspects of the client computing device and/or the display page may facilitate such local interaction. For example, an application on the client computing device (e.g., a web browser) may enable interaction with a detail page without transmitting interaction information to electronic catalog system. As a further example, the detail page itself may enable local interaction, such as by including dynamic elements (also known as "dynamic content") within the detail page (e.g., elements that may be modified within a content item based on user interaction).

Accordingly, in order to provide more detailed interaction regarding local interaction with a content item, a client computing device may be provisioned with a local interaction monitoring component configured to monitor local interaction with a content item. In one embodiment, the local interaction monitoring component may be transmitted to the client computing device in conjunction with a content item, such as a detail page. Illustratively, the local interaction monitoring component may be implemented in client-side scripting (e.g., JavaScript, ActionScript, Flash, or Dynamic HTML) embedded within a content item. The local interaction monitoring component may be configured to monitor interaction with a content item that would not generally require interaction with a remote system (and that may therefore be unknown to a remote system). As will be described in more detail below, examples of local interaction may include, but are not limited to, scrolling a content item, resizing a content item (e.g., minimizing or maximizing the content item), otherwise modifying a viewed portion of a content item, mouse or keyboard interaction with a content item, focusing or defocusing a content item, and timing information related to such interactions.

In one embodiment, local interaction with a content item may be monitored with respect to pre-defined portions of the content item. For example, local interaction may be monitored with respect to a number of horizontal "stripes" of a content item, each spanning the entire width of the content item but only a portion of the height of a content item. Illustratively, each horizontal stripe may correspond to a 25 pixel-height portion of a content item, such that when placed together, the stripes collectively represent the content item. Monitoring interaction with respect to portions of a display page may reduce the processing requirements of the local interaction monitoring component. For example, scrolling movement that modifies the output of a content item by less than 25 pixels may be able to be ignored (e.g., if it does not modify the displayed stripes). Moreover, monitoring interaction with respect to portions of a display page may reduce the processing and storage required to aggregate interaction data monitored on a number of devices, as interaction may be aggregated with respect to each horizontal stripe. Though description may be made herein with respect to horizontal portions, local interaction may be monitored with respect to any set of portions of a content item. For example, as will be discussed in more detail below, local interaction may be monitored with respect to a number of vertical stripes, each spanning the entire height of the content item but only a portion of the width of the content item. In some embodiments, interaction may be monitored with respect to both horizontal and vertical stripes within a content item. As will be discussed below, by comparing data at an intersection between horizontal and vertical stripes, a "grid" representative of interaction at each intersection may be generated.

Further, in some embodiments, processing of local interaction information may be executed remotely from the client computing device (e.g., by the electronic catalog system). For example, the local interaction monitoring component executing on the client computing device may transmit "raw" local interaction information (e.g., reflecting scroll activity, mouse movement, etc.) to a remote processing component. The remote processing component may, in turn, process the local interaction information (exclusively or with additional information reflecting the content item) to produce page-level usage data, as will be described in more detail below.

In one embodiment, processing of local interaction data to generate page-level usage data may be facilitated wholly or in part by repeating or replaying the local interaction on a remote computing device. Illustratively, in accordance with aspects of the present disclosure, local interaction information may be transmitted to an interaction replay module configured to determine page-level usage, data based on the local interaction information. Specifically, the interaction replay module may utilize the local interaction information (e.g., in addition to other information) in order to recreate a set of local interaction events and conduct additional analysis with regard to those events. For example, local interaction information may reflect that, while viewing a detail page, a client viewed the first third of the detail page for ten seconds, then scrolled to the second third of the detail page for five seconds, and then closed the page. However, the local interaction information may not reflect additional information needed to generate accurate page-level usage data, such as what elements existed within the first third of the detail page, the second third of the detail page, etc. Accordingly, the interaction replay module may generate a detail page corresponding to that displayed by the client device, view the first third of the detail page for ten seconds, and then view the second third of the detail page for five seconds. Meanwhile, the interaction replay module (or an additional module) may conduct analysis on the recreated interaction, such as determining what elements are displayed in the regenerated detail page during the interaction. Additionally, in some embodiments, timing information reflected in local interaction information may not be required to be strictly followed by the interaction replay module. For example, the interaction replay module may replay local interaction at a substantially faster rate (e.g., 2 seconds and 1 second, rather than 10 seconds and 5 seconds), or may ignore timing information when replaying events, if unnecessary to determine accurate page-level usage data. By utilizing an interaction replay module, a substantial amount of the processing required to generate page-level usage data may be executed by the electronic catalog system, rather than by the client computing device. Because of the low processing requirements on the client computing device itself, embodiments of the present disclosure may be implemented without substantially impacting the experience of the client. Moreover, by utilizing an interaction replay module, analysis required to generate page-level usage data may be conducted at any point subsequent to interaction, which may enable processing of a large amount of local interaction information (e.g., from multiple client computing devices) at a single point in time most convenient for the electronic catalog system.

In addition, in some embodiments, page-level usage data may be processed (e.g., by the electronic catalog system) in order to reduce the storage capacity needed to store the data, to reduce the complexity of retrieving or displaying data, or to increase the clarity of the data to clients. For example, in one embodiment, page-level usage data may be aggregated across a number of clients (e.g., reflecting a variety of interactions with a content item). In one embodiment, page-level usage data may be aggregated at a similar granularity as interaction information is collected. For example, if interaction information is collected with respect to 25 pixel height horizontal stripes (each representing a portion of a content item), page-level usage data may also be aggregated with respect to each 25 pixel height horizontal stripe. Illustratively, page-level usage data may reflect that, on average, clients viewed a first horizontal stripe for 10 seconds while viewing a second horizontal stripe for 3 seconds, and a third horizontal stripe for only 1 second. Similarly, page-level usage data may be generated based on additional or alternative portions of a content item, such as vertical stripes of the content item. Further, in instances where page-level usage data is generated based on both horizontal and vertical stripes of a content item, page-level usage data may be derived for each intersection between two sets of stripes. Such usage data may be useful to the electronic catalog system, for example, in order to identify portions of a display page most utilized by clients.

In some embodiments, page-level usage data may further be aggregated based at least in part on an aspect of the client computing device. For example, page-level usage data may be aggregated based on the width of the portion of the content item output on the client computing device, which may also be referred to as "viewport width" (where viewport corresponds to the portion of the content item output on the client computing device). Illustratively, clients viewing a content item on a 1024 pixel width viewport may view a different portion of the content item than clients viewing the content item on a 1920 pixel width viewport (e.g., because the rendering of the content item is dependent at least in part on the viewport width). Accordingly, client interaction with a detail page via 1024 pixel width viewport may be aggregated together, while being distinct from client interaction with a detail page via 1920 pixel width viewport. Aggregating based on viewport width may increase the accuracy of page-level usage data, particularly where elements of a content item vary in placement based on viewport width.

Moreover, in some embodiments, page-level usage data may be distinguished or aggregated based on a client's interaction with a content item or on the content item itself. For example, in one embodiment, content may correspond to a detail page describing goods or services offered for acquisition from the electronic catalog system. Client's viewing the detail page may take a number of different actions with respect to the detail page. Illustratively, when viewing the detail, a client may elect to acquire a described good or service, to mark the described good or service (e.g., by marking it as a "favorite," by placing the described good or service in a virtual basket, shopping cart, or wish list, etc.), to create a review or recommendation regarding the good or service, or not to take any further action. Accordingly, in one embodiment of the present disclosure, page-level usage data may be distinguished or differentiated based on these client actions. For example, a first set of page-level usage data may be determined for all clients that made a purchased based on a detail page, while a second set of page-level usage data may be determined for all clients that placed a good or service in a wish list. Though illustrative aspects of client's actions are described herein, page level usage data may be distinguished or aggregated based on any client action taken with respect to a content item.

Still further, though aspects of the present disclosure may be described with respect to a single content item (e.g., a single web page), in some embodiments, page-level usage data may be generated based on client interaction with a number of content items. For example, a set of content items may each correspond to category of content items (e.g., detail pages for books offered for acquisition on the electronic catalog system). Page-level usage data for each content item within the category may be aggregated in order to generate page-level usage data for the category of content items. Illustratively, page-level usage data for all "book" detail pages may reflect that clients tend to output the top portion of detail pages (e.g., corresponding to a description of the book) more frequently than other portions of detail pages. Further, in some embodiments, page-level usage data may be aggregated based on timing information, such as the date of interaction with a content item. Illustratively, page-level usage data corresponding to an individual day may be aggregated to generate total or average page-level usage data for that day. Though described herein with reference to a time period of a single day, page-level usage data may be aggregated across any time period (e.g., seconds, minutes, hours, days, weeks, months, etc.). In addition, in some embodiments, it may be desirable to retrieve page-level usage data (e.g., number of times a portion of content has been viewed) for an arbitrary range of times (e.g., a time period for Jan. 5, 2012 to Jan. 9, 2012). Accordingly, in some embodiments, page-level usage data may be formatted or stored to facilitate retrieval of data across a range of time periods. Such formatting will be described in more detail below. In brief, page-level usage data for a given period of time (e.g. a single day) may be partially or wholly aggregated with page-level usage data from a previous time period (such as aggregate page-level usage data occurring previously within the same month). Such aggregation may facilitate rapid retrieval or calculation of page-level usage data across time periods. For example, where a value representing the number of times content (or a portion thereof) has been viewed on each date reflects the total content views within the same month, calculation of content views from Jan. 5, 2012 to Jan. 9, 2012 would require only subtraction of the number of content views as of Jan. 5, 2012 from the number of content views as of Jan. 9, 2012.

Aspects of the present application are further directed to the output and display of page-level usage data. Specifically, in one embodiment, page-level usage data may be output in conjunction with the content to which the page-level usage data corresponds. For example, page-level usage data regarding an item detail page may be output in conjunction with the item detail page itself. In one embodiment, graphs reflecting page-level usage data of a content item are displayed in conjunction with the content item itself (e.g., as an overlay to the content item, to the side of the content item, etc.). Further, the graphs may be modified to highlight the portion of the graph which reflects the currently viewed portion of the content item. For example, when viewing the first third of a display page, a graph may be displayed reflecting page-level usage data for the entire display page, but highlighting the usage data relevant to the first third of the display page. In other embodiments, gauges may be displayed that cover the entire height of a content item. Each portion of a gauge may reflect page-level usage data specific to a corresponding portion of the content item (e.g., a 25 pixel height portion of the gauge may reflect page-level usage data for the corresponding 25 pixel height horizontal stripe of the content item). Accordingly, data regarding each portion of a content item may be provided in conjunction with that portion of the content item. In some such embodiments, clients may be enabled to interact with the gauge to display additional information regarding the portion of the content item, as will be described in more detail below.

With reference now to FIG. 1, a block diagram is shown depicting an illustrative operating environment 100 in which an electronic catalog system 120 enables customers to browse content regarding a plurality of items offered for acquisition. Moreover, in accordance with aspects of the present disclosure, the electronic catalog system 120 may monitor interaction with the content in order to generate page-level usage data for the content. As illustrated in FIG. 1, the operating environment 100 includes one or more client computing devices 102 in communication with the electronic catalog system 120 via a network 110. A client computing device 102 may be any computing device, such as personal computer (PC), kiosk, thin client, home computer, and dedicated or embedded machine. Further examples may include a laptop or tablet computers, servers, personal digital assistant (PDA), hybrid PDA/mobile phones, mobile phones, electronic book readers, set-top boxes, cameras, digital media players, and the like. Client computing devices 102 may correspond to any user of the electronic catalog system 120 (described in more detail below). In some instances, client computing devices 102 may be associated with an operator of the electronic catalog system 120. For example, client computing devices 102 may correspond to an administrator or developer of the electronic catalog system 120. In other instances, client computing devices 120 may represent end users of the electronic catalog system 120 (e.g., users wishing to browse or acquire items from the electronic catalog system).

The network 130 may be any wired network, wireless network or combination thereof. In addition, the network 130 may be a personal area network, local area network, wide area network, cable network, satellite network, cellular telephone network, or combination thereof. Protocols and components for communicating via any of the other aforementioned types of communication networks are well known to those skilled in the art of computer communications and thus, need not be described in more detail herein.

The client computing devices 102 may further include a local interaction monitoring component 104 configured to monitor interaction with content provided by the electronic catalog system 120. In one embodiment, the local interaction monitoring component 104 may be transmitted to the client computing device 102 (e.g., as included within a content item, such as a display page). For example, the local interaction monitoring component 104 may be implemented by client-side script (e.g., JavaScript, etc.) included within a web page provided to the client computing device 102 by the electronic catalog system 120. The local interaction monitoring component 104 may be configured to gather any data reflective of user interaction with a content item, including but not limited to scrolling a content item, mouse interaction with a content item (e.g., movement and selection), keyboard interaction with a content item (e.g., keystrokes), other input by a client of the client computing device (e.g., touchscreen input, voice input, etc.), interaction with the content item by other elements or components of the client computing device 102 (such as software components, plugins, add-ons, etc.), focusing or defocusing a content item (e.g., by selecting or deselecting a user interface including the content item), and timing information related to any of the above interaction. The local interaction monitoring component 104 may further be configured to transmit the monitored local interaction information to the electronic catalog system 120.

The electronic catalog system 120 is illustrated in FIG. 1 as operating in a distributed computing environment comprising several computer systems that are interconnected using one or more networks. More specifically, the electronic catalog system 120 may include a web server 126, an item catalog 122, a page templates data store 124, a local interaction data store 128, a remote interaction data store 134, an interaction monitoring component 130, an interaction replay component 132, and a page-level usage data store 136, each of which will be discussed in greater detail below. However, it may be appreciated by those skilled in the art that the electronic catalog system 120 may have fewer or greater components than are illustrated in FIG. 1. In addition, the electronic catalog system 120 could include various Web services and/or peer-to-peer network configurations. Thus, the depiction of the electronic catalog system 120 in FIG. 1 should be taken as illustrative and not limiting to the present disclosure.

Any one or more of the web server 126, the item catalog 122, the page templates data store 124, the local interaction data store 128, the remote interaction data store 134, the interaction monitoring component 130, the interaction replay component 132, and the page-level usage data store 136, may be embodied in a plurality of components, each executing an instance of the respective web server 126, item catalog 122, page templates data store 124, local interaction data store 128, remote interaction data store 134, interaction monitoring component 130, the interaction replay component 132, and page-level usage data store 136. A server or other computing component implementing any one of the web server 126, the item catalog 122, the page templates data store 124, the local interaction data store 128, the remote interaction data store 134, the interaction monitoring component 130, the interaction replay component 132, and the page-level usage data store 136 may include a network interface, memory, processing unit, and computer readable medium drive, all of which may communicate with each other by way of a communication bus. For example, an included network interface may provide connectivity over the network 110 and/or other networks or computer systems. A processing unit (as included may in any of the components discussed above) may communicate to and from memory containing program instructions that the processing unit executes in order to operate the web server 126, item catalog 122, page templates data store 124, local interaction data store 128, remote interaction data store 134, interaction monitoring component 130, the interaction replay component 132, and page-level usage data store 136. An included memory may generally include RAM, ROM, other persistent and auxiliary memory, and/or any non-transitory computer-readable media.

With further reference to FIG. 1, illustrative components of the electronic catalog system 120 will now be discussed. The web server 126 may facilitate interaction with the electronic catalog system 120, such as via the Hypertext Transfer Protocol (HTTP) and various web pages. For example, the web server 126 may provide a variety of display pages, each regarding items offered for acquisition by the electronic catalog system 120, as well as additional pages enabling browsing, searching, and ordering such items. Items, or information regarding the items, may be stored within the item catalog 122, which may correspond to any data store or collection of data stores, such as hard disk drives (HDDs), solid state drives (SSD's), tape drives, network attached storage (NASs) or any other persistent or substantially persistent storage component. The web server 126 may utilize one or more page templates to generate each detail page (or other pages), and each page template may be stored within the page templates data store 124. Similarly to the item catalog 122, the page templates data store 124 may correspond to any persistent or potentially persistent storage component, such as an HDD, SSD, tape drive, NAS, etc. Page templates may include a variety of content regarding items, including but not limited to descriptive information, images, pricing, recommendations, ratings, or reviews regarding items available from the electronic catalog system 120. Further, while page templates may be utilized to generate a display page for output to a client computing device 102, one skilled in the art will appreciate that some aspects of the display page may not be included in a page template, such as item information contained within the item catalog 122. Further, all or a portion of each page template may be dependent on external information, such as the content of the item catalog 122, the identity of a requesting client computing device 102, etc.

The electronic catalog system 120 may further include an interaction monitoring component 130 operable to monitor interaction with content (e.g., display pages) by client computing devices 104. In some embodiments, interaction may be monitored in conjunction with the web server 126. For example, the web server 126 may notify the interaction monitoring component 130 upon transmission of information (e.g., a display page) to the client computing device 102. Information regarding the interaction between the client computing device 102 and the electronic catalog system 120 (e.g., the web server 126) may generally be referred to as remote interaction. For example, a request for a detail page from a client computing device 102 to the electronic catalog 120 may constitute remote interaction. Because remote interaction includes the electronic catalog system 120, information regarding the interaction may be acquired independent of the local interaction monitoring component 104. For example, the web server 126 may notify the interaction monitoring component 130 that a specific display page was transmitted to the client computing device 102 at a specific point in time. Thereafter, the interaction monitoring component 130 may store the remote interaction information in a remote interaction data store 134. Similarly to the data stores discussed above, the remote interaction data store 134 may correspond to any persistent or potentially persistent storage component, such as an HDD, SSD, tape drive, NAS, etc. As will be discussed below, remote interaction data may be utilized to generate page-level usage data corresponding to the content transmitted to the client computing device 102.

The interaction monitoring component 130 may further be configured to interact with the local interaction monitoring component 104 (e.g., via the web server 126) in order to retrieve local interaction information. Such local interaction information may be stored, for example, in the local interaction data store 128. Similarly to the data stores discussed above, the local interaction data store 128 may correspond to any persistent or potentially persistent storage component, such as an HDD, SSD, tape drive, NAS, etc. Local interaction information may be utilized in conjunction with additional information (e.g., remote interaction information) to generate page-level usage data corresponding to the content transmitted to the client computing device 102, as will be described below.

Still further, the electronic catalog 120 may include an interaction replay component 132 configured to utilize local and/or remote interaction information to generate page-level usage data. In one embodiment, the interaction replay component 132 may utilize such information in order to recreate or replay the interactions of the client computing device 102, and to further analyze such interactions in order to generate page-level usage data. Illustratively, the interaction replay component 132 may implement a web browser or web browser analog (e.g., a component configured to simulate a web browser), and utilize such a browser to recreate a detail page viewed by the client computing device 102, as determined by the remote interaction information. Thereafter, the interaction replay component 132 may utilize local interaction information to recreate client interaction with the detail page. For example, if local interaction information reflects that the client scrolled from the first fifth of a detail page at a first point in time, and then to a third fifth at a second point in time, the interaction replay component 132 may take the same actions within the recreated detail page. The interaction replay component 132 may further analyze the state of the detail page at each interaction in order to determine page-level usage data corresponding to the interaction. Still further, interaction replay component 132 may process such page-level usage data in order to facilitate ease of use of the page-level usage data, as will be described below. Page-level usage data may then be stored in the page-level usage data store 136. Similarly to the data stores discussed above, the page-level usage data store 136 may correspond to any persistent or potentially persistent storage component, such as an HDD, SSD, tape drive, NAS, etc. As described above, by use of an interaction replay component 132 to generate page-level usage data, the processing required to generate such data may be executed by the electronic catalog system 120, rather than the client computing device 102. Aspects of the present disclosure may therefore be implemented without substantially increasing the processing requirements of the client computing device 102.

Though details of the present disclosure will be described with respect to an interaction replay component 132, in some embodiments, page-level usage data may be generated by the client computing device 102 itself (e.g., during the initial output of content on the client computing device 102 or during a replay of interactions on the client computing device 102). For example, the processing requirements of generated page-level usage data may be reduced, or the processing power of client computing devices may be increased, such that generation on the client computing device 102 does not impact user experience.

As will be described in more detail below, the web server 126 may further be configured to provide page-level usage data to client computing devices 102 (e.g., where a client computing device 102 corresponds to an administrator or developer authorized by the electronic catalog system 120, etc.). For example, page-level usage data regarding a detail page may be output in conjunction with the detail page. In one embodiment, graphs of page-level usage data may be displayed reflecting page-level usage data for the entirety of a content item. In another embodiment, gauges may be provided on top of or alongside a content item, with each portion of the gauge reflecting page-level usage data of a corresponding portion of the content item.

Figure 2A:
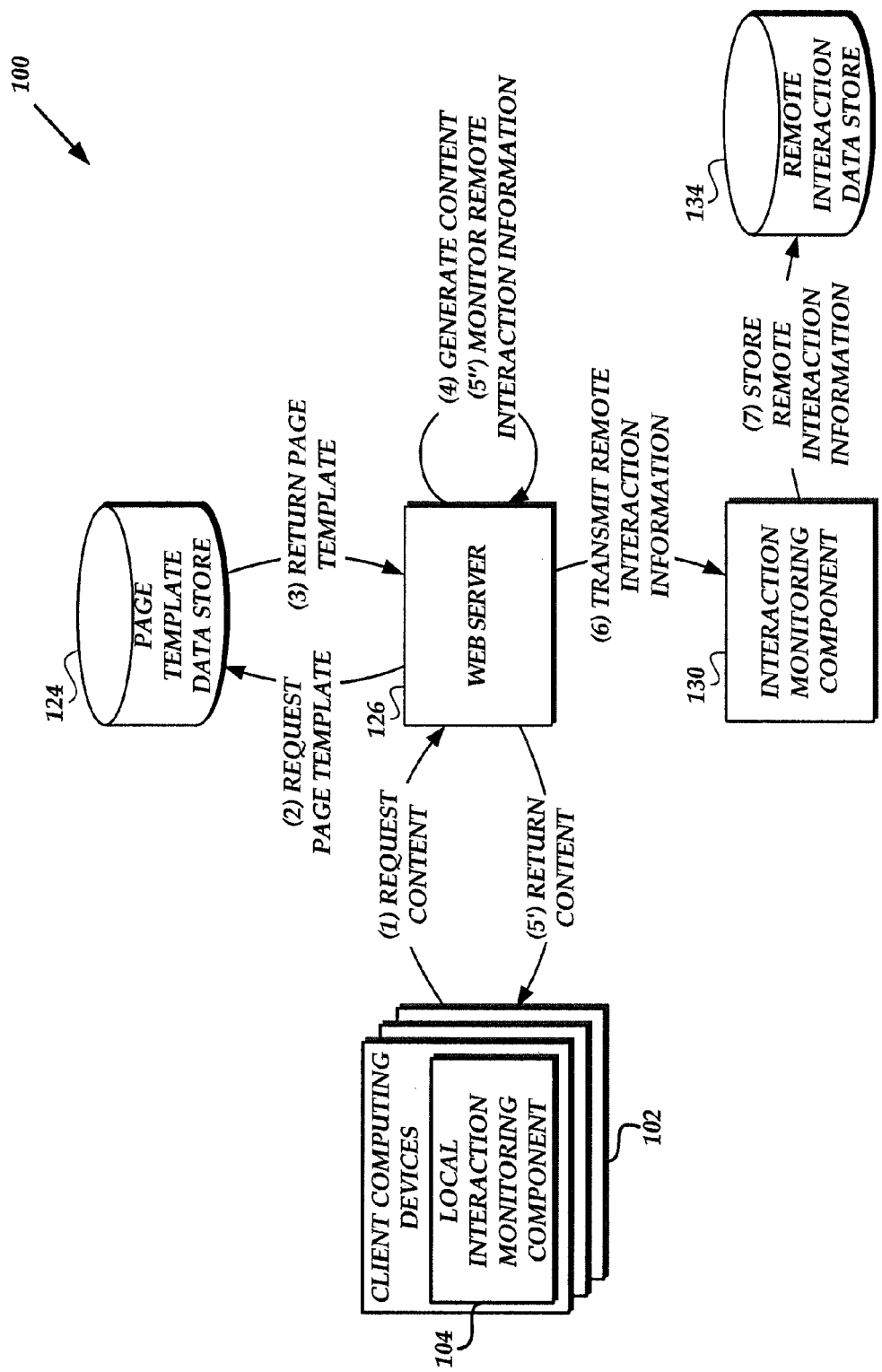
FIG. 2A is a block diagram depicting the provision of content to a client computing device and the monitoring of remote interaction information corresponding to the content by the electronic catalog system of FIG. 1.
Figure 2B:
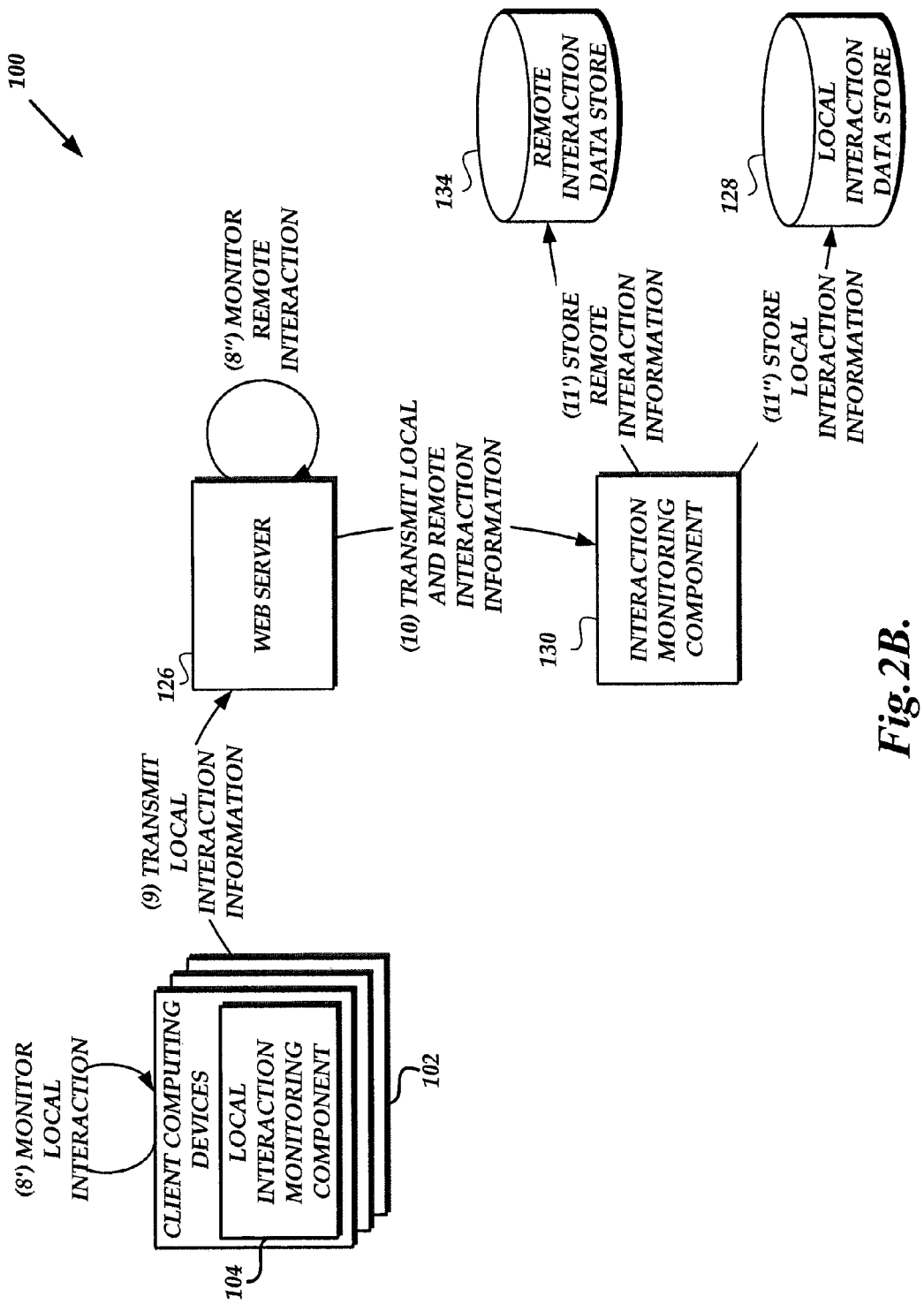
FIG. 2B is a block diagram depicting the monitoring of local interaction information by a client computing device and transmission of such local interaction information to the electronic catalog system of FIG. 1.
Figure 2C:
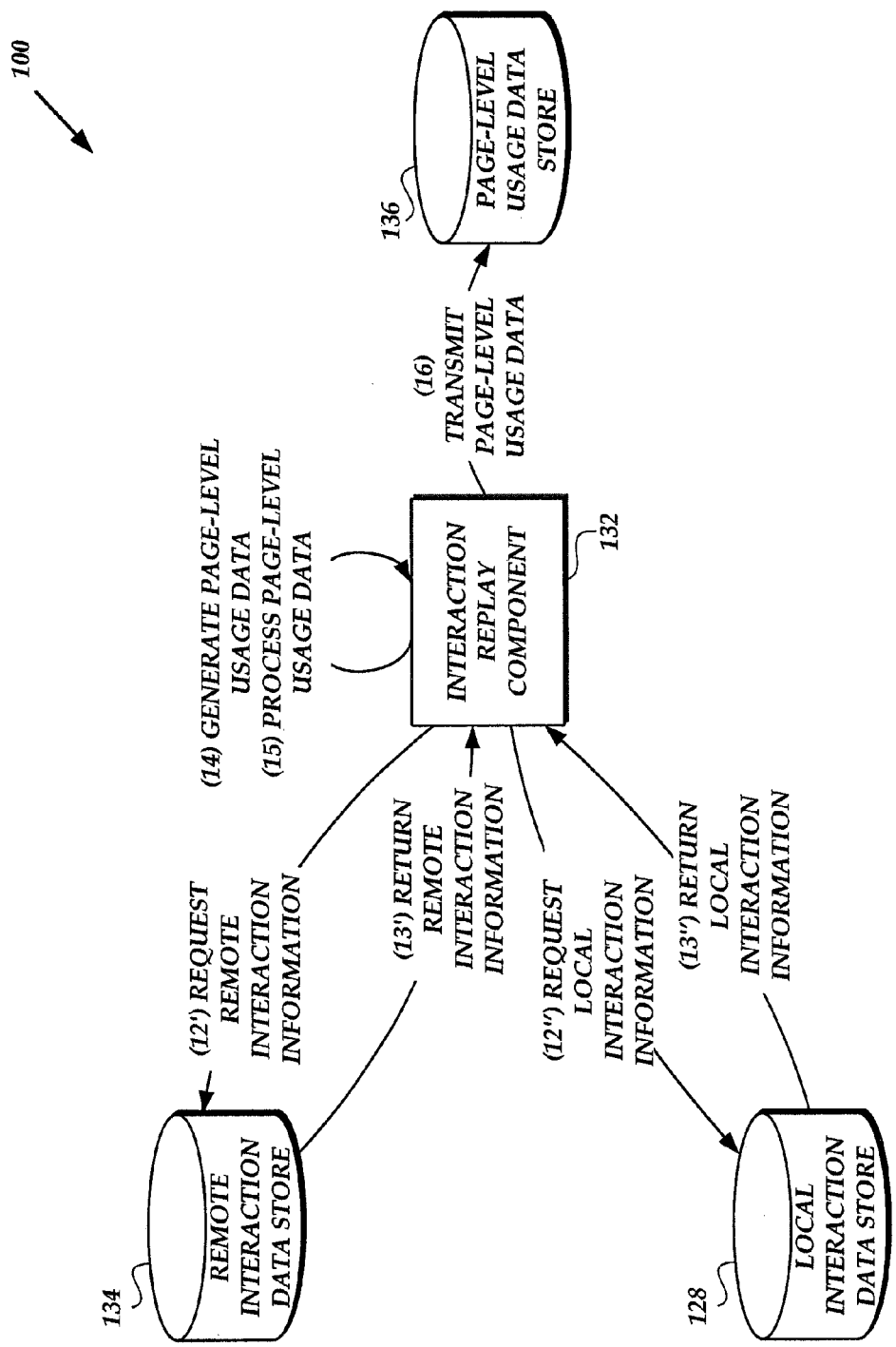
FIG. 2C is a block diagram depicting the generation and processing of page-level usage data by the electronic catalog system of FIG. 1 based at least in part on local interaction information and remote interaction information.

With reference to FIGS. 2A-2C, an illustrative interaction for generating page-level usage data regarding content provided by the electronic catalog system 120 of FIG. 1 will be described. Specifically, FIG. 2A depicts an illustrative interaction for generating a content item (e.g., a display page) for output on a client computing device 102, as well as for monitoring remote interaction information corresponding to the content item. FIG. 2B depicts an illustrative interaction for monitoring local and remote interaction corresponding to a content item provided by the electronic catalog system 120, and for storing local and remote interaction information for the generation of page-level usage data. FIG. 2C depicts an illustrative interaction for generating page-level usage data based on local and remote interaction information, and for processing such page-level usage data for future retrieval and access. Though each of the illustrative interactions of FIGS. 2A-2C could occur independently, numbering is maintained throughout FIGS. 2A-2C for simplicity.

With reference to FIG. 2A, an illustrative interaction for generating a content item (e.g., a display page) for output on a client computing device 102, as well as for monitoring remote interaction information corresponding to the content item will be described. Specifically, at (1), a client computing device 102 may transmit a request for content to the web server 126. Illustratively, such a request may be an HTTP request to view a display page (e.g., a web page) corresponding to an item available from acquisition through the electronic catalog system 120. One example of such a display page will be described below with respect to FIG. 4A. Thereafter, at (2), the web server 126 may request a page template corresponding to the requested display page from the page template data store 124. A page template may generally correspond to any template of information enabling the web server 126 to generate the requested content for output to the client computing device 102. For example, a page template may correspond to a hyper-text markup language (HTML) document, or to a document enabling the generation of an HTML document (e.g., a PHP script, an Active Server Page script, a Common Gateway Interface script, etc.). At (3), a relevant page template may be returned to the web server 126. Thereafter, at (4), the web server 126 may utilize the page template in order to generate content, and at (5'), transmit the generated content to the client computing device 102. In addition, at (5"), the web server 126 may monitor remote interaction information regarding the generated content. Illustratively, monitoring remote interaction information may correspond to recording that the client computing device 102 received the specific content at a given point in time. Monitoring remote interaction information may further include monitoring any information that may be utilized to generate page-level usage data, such as an identity of the client computing device 102 (or client thereof), a location or address (e.g., IP address, physical location, etc.), of the client computing device 102, or capabilities of the client computing device 102 (e.g., viewport size, operating system, browser, etc.). In general, monitoring of remote interaction information to (as represented by 5") may occur simultaneously to, prior to, or after returning content to client computing device 102 (as represented by 5'). After monitoring remote interaction information, the web server 126 may, at (6), transmit the remote interaction information to the interaction monitoring component 130. The interaction monitoring component 130 may, in turn, store the remote interaction information in the remote interaction data store 134, at (7). In one embodiment, transmission of remote interaction information (and/or monitoring thereof) may be facilitated by mechanisms already in place within the web server 126. For example, monitoring and/or transmission of remote interaction information may correspond to placing information into a data log, such as a web server log, reflecting the requested display page. In some such embodiments, the web server 126 may record remote interaction information directly to the remote interaction data store 134 (e.g., in the form of a data log), and as such, the interaction monitoring component 130 may not be required.

With reference to FIG. 2B, an illustrative interaction for monitoring local and remote interaction corresponding to a content item provided by the electronic catalog system 120, and for storing local and remote interaction information for the generation of page-level usage data will be described. Illustratively, the interactions of FIG. 2B may occur at any point subsequent to the interactions of FIG. 2A, or may occur independent of the interactions of FIG. 2A. Specifically, at (8'), local interaction with a content item output on the client computing device 102 may be monitored. Such monitoring may be facilitated, for example, by the local interaction monitoring component 104. In one embodiment, the local interaction monitoring component 104 may interact with other elements or components of the client computing device 102, such as a web browser displaying a content item, in order to record local interaction information. For example, the local interaction monitoring component 104 may utilize the Document Object Model (DOM) of a web browser executing on the client computing device 102 in order to identify local interaction events. As described above, local interaction events may generally refer to any interaction with a content item. For example, local interaction events may refer to resizing a viewport for viewing the content item, to scrolling a content item (e.g., such that the viewed portion of the content item is altered), to mouse interaction or keyboard interaction, or to timing information associated with any of the above. In one embodiment, the location interaction monitoring component 104 is implemented within JavaScript executing on the client computing device 102.

In some embodiments, the granularity of local interaction information that is monitored may be altered in order to balance a desired detail level as well as a desired processing power to obtain such a detail level. For example, where a high level of detail is required, and processing power is of a lesser concern, the local interaction monitoring component 104 may record each local interaction event to the greatest extent possible. As a further example, the local interaction monitoring component 104 may record local interaction events only at each of a set of pre-defined periods. Illustratively, the local interaction monitoring component 104 may record local interaction at every 100 milliseconds, every 200 milliseconds, etc. In some instances, monitoring interaction information may be facilitated by monitoring a state of the client computing device 102 at each monitoring interval. For example, the local interaction monitoring component 104 may record the currently viewed coordinates of a content item (e.g., as reported by the DOM) at each interval within a set of intervals, and report such coordinates as local interaction information.

Still further, in some embodiments, monitoring of local interaction information may correspond to monitoring interaction with a plurality of portions of a content item. For example, as will be described below, a content item may, for the purposes of monitoring, be divided into multiple horizontal or vertical portions. Each horizontal or vertical portion may span the entirety of a first dimension (e.g., width or height, respectively) of a content item, but only a portion of a second dimension (e.g., height or width, respectively) of the content item. Illustratively, each horizontal portion may be 25 pixels tall, while each vertical portion may be 25 pixels wide. Horizontal or vertical portions may alternatively be referred to herein as horizontal or vertical "stripes." By monitoring interaction with respect to designated portions of a content item (e.g., horizontal or vertical stripes), the processing power required to monitor and/or transmit local interaction information may be reduced. For example, client interaction that does not modify specific horizontal or vertical stripes output to a client may not be required to be recorded. As will be described below, horizontal or vertical stripes may also be utilized in order to generate page-level usage data based on local interaction information.

Simultaneously to monitoring local interaction information at (8'), the web server 126 may continue to monitor remote interaction information at (8") as described above with respect to FIG. 2A (e.g., at 5"). For example, the web server 126 may continue to log any requests for content from the client computing device 102 (e.g., for additional elements to be included within a currently displayed content, for new content items, etc.).

During or after the monitoring of local interaction information, the local interaction monitoring component 104 may transmit the local interaction information to the web server module 126 at (9). Transmission of the local interaction information may occur via any number of communication channels. In one embodiment, the local interaction monitoring component 104 may utilize beacons or "web beacons" to transmit local interaction information to the web server 126. In general, web beacons may refer to a content element utilized to track client interaction with the content without interfering with consumption of the content. For example, a web beacon may constitute a 1 pixel by 1 pixel transparent image. When a client computing device 102 requests a web beacon from the web server 126, the request itself may constitute transmission of information to the web server 126. For example, a request for "web beacon ABC" received from the client computing device 102 may notify the web server 126 that the client computing device 102 has viewed a first portion of a content item. Though web beacons are described herein illustratively as requests for images, any request transmitted to the web server 126 which itself is meant to transmit information to the web server 126 may be utilized as a web beacon without departing from the present disclosure. For example, the local interaction monitoring component 104 may transmit a request to the web server 126 for the content item located at universal resource locator (URL) "http://ecatalog.tld/blank.php?<X,Y>," where "<X, Y>" is modified to indicate current viewing coordinates of the client computing device 102. Use of web beacons (or other content requests) may facilitate ease of transmission of local interaction information. For example, in some embodiments, web beacon requests corresponding to local interaction information may be logged within a data log (e.g., a web server log) according to already existing mechanisms.

After transmission of local interaction information to the web server 126, the web server 126 may transmit the local interaction information and any monitored remote interaction information to the interaction monitoring component 130 at (10). Thereafter, the interaction monitoring component 130 may, at (11') and (11"), store the remote interaction information and the local interaction information in the remote interaction data store 134 and the local interaction data store 128, respectively. As described above, in some embodiments, location interaction information and remote interaction information may be reflected within logs already maintained by the web server 126, such as web server logs. In these embodiments, storage of the local and remote interaction information may not require the interaction monitoring component 130, which therefore may be omitted.

With reference to FIG. 2C, an illustrative interaction for generating page-level usage data based on local and remote interaction information, and for processing such page-level usage data for future retrieval and access will be described. Illustratively, the interactions of FIG. 2C may occur at any point subsequent to the interactions of FIG. 2B, or may occur independent of the interactions of FIG. 2B. Specifically, at (12') at (12"), the interaction replay component may request remote interaction information and local interaction information from the remote interaction data store 134 and the local interaction data store 128, respectively. In some embodiments, the requested remote and local interaction information may correspond to a single interaction session (e.g., a set of related interaction events), such as the viewing of a single display page by a specific client computing device 102. In other embodiments, the requested remote and local interaction information may correspond to multiple interaction sessions (e.g., by different client computing devices 102, different clients utilizing such devices, or interactions occurring in disparate times). Thereafter, at (13') and (13"), the requested remote interaction information and local interaction information may be returned by the remote interaction data store 134 and the local interaction data store 128, respectively.

At (14), the interaction replay component 132 may utilize the local and remote interaction information in order to generate page-level usage data corresponding to the interaction information. One embodiment for generation of page-level usage data will be described in more detail below with respect to FIG. 6. In brief, the interaction replay component 132 may generate a replay environment, such as a web browser or web browser analog, in which local interaction events reflected in the local interaction information (e.g., scrolling, resizing of viewport, client input, etc.) may be recreated with respect to a content item. Thereafter, the interaction replay component 132 may replay each local interaction event reflected in the local interaction information in order to simulate the client computing device 102's interaction with the content item. During replay of the local interaction information, the interaction replay component 132 may monitor the state of the replay environment in order to determine page-level usage data. As noted above, page-level usage data may generally correspond to any aspect of the interaction with a content item that may be determined based on local interaction information. Moreover, page-level usage data may include information corresponding to each portion of a content item. For example, page-level usage data may reflect whether a client viewed a specific portion of a content item for a threshold amount of time (e.g., greater than 0 seconds, 1 second, etc.), the amount of time a specific portion of a content item was viewed, the speed of scrolling of a content item while a specific portion was in view. In one embodiment, page-level usage data may be generated for each of a number of horizontal portions (e.g., horizontal "slices" of a given height) of a content item. For example, the interaction replay component 132 may determine if a specific horizontal portion of a content item was output by a client computing device 102, how long the specific horizontal portion was output, etc.

In some embodiments, page-level usage data may be aggregated across a number of outputs by multiple client computing devices 102. For example, page-level usage data may reflect the percentage of client computing devices 102 that output a portion of a content item (e.g., a horizontal "stripe" of the content item) for at least a threshold amount of time, the average time a portion of a content item was viewed by clients of client computing devices 102, average speed of scrolling corresponding to a portion of a content item, etc.

In addition, the interaction replay component 132 may process the page-level usage data in order to facilitate ease of output or future use of the data. Processing of page-level usage data will be described in more detail with respect to FIG. 8 below. In brief, it may be beneficial to display page-level usage data across any selected time period (e.g., between two client-specified dates). Accordingly, the interaction replay component 132 may be configured to partially aggregate page-level usage data prior to storing the data in the page-level usage data store 136. For example, page-level usage data for a specific date may be aggregated with page-level usage data of a number of previous dates. As will be described below, such aggregation may facilitate rapid calculation of page-level usage data between a set of user-specified dates.

After processing the page-level usage data, the processed data may be stored in the page-level usage data store 136 for future retrieval. Illustratively, the page-level usage data may be retrieved from the page-level data store and output in conjunction with the corresponding content item, as will be described in more detail with respect to FIG. 9.

Though generation of page-level usage data and processing of page-level usage data are described above with respect to the interaction replay component 132, in some embodiments, the interaction of FIG. 2C may be implemented by alternative components. For example, in one embodiment, a client computing device 102 may generate and/or process page-level usage data as described above.

Figure 3A:
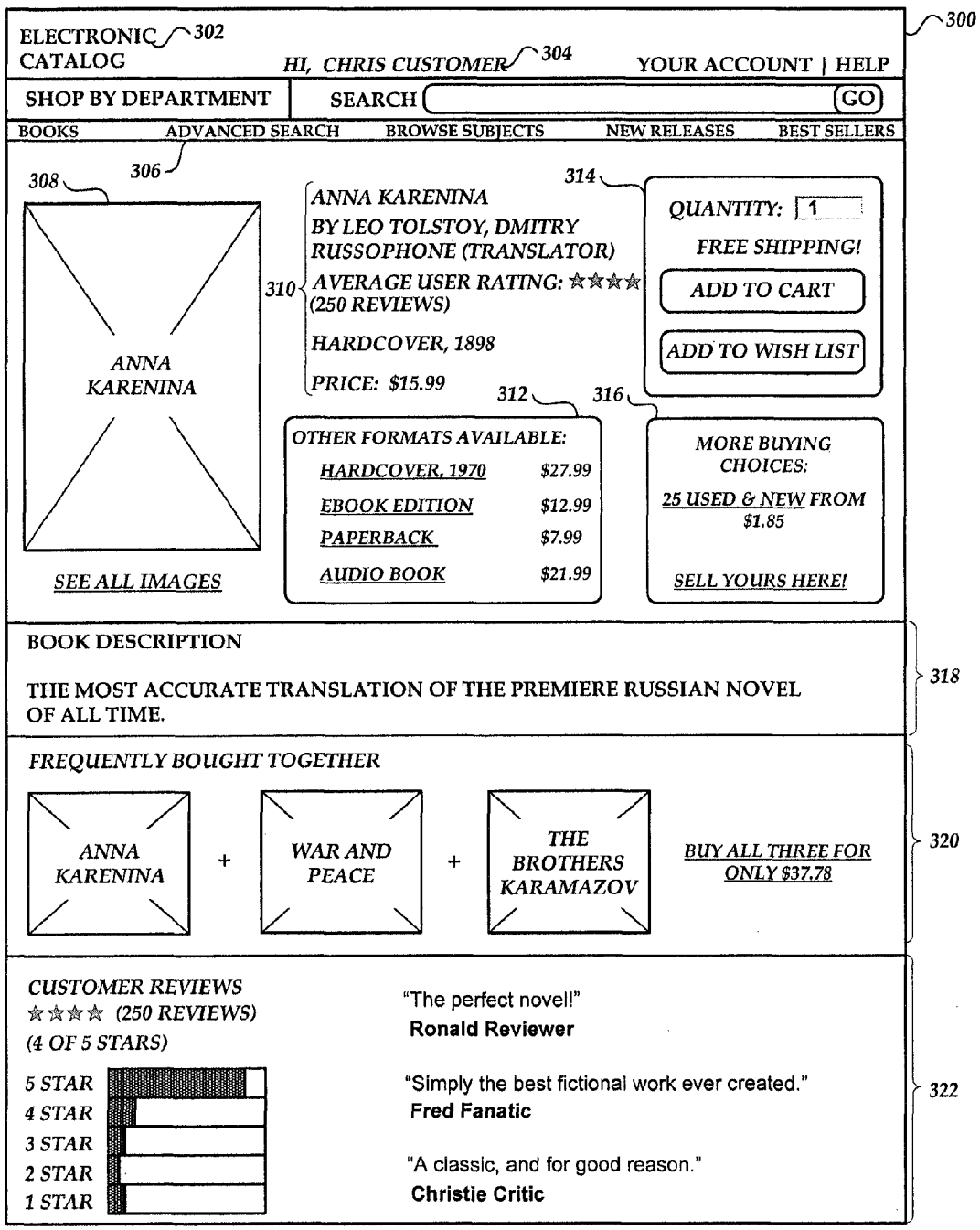
FIG. 3A is an illustrative graphical representation or visualization of content provided by the electronic catalog system of FIG. 1 for one or more client computing devices.

With reference to FIG. 3A, an illustrative graphical representation or visualization of content provided by the electronic catalog system 120 of FIG. 1 will be described. Specifically, the graphical representation or visualization depicted in FIG. 3A corresponds to a display page 300 including information regarding an item available for acquisition from the electronic catalog system 120. In one embodiment, display page 300 is generated by web server 126 as a result of a request by a client computing device 102. As shown in FIG. 3A, the display page 300 provides information retrieved from the electronic catalog system 120, i.e., the "Electronic Catalog" 302 to "Chris Customer" 304, an illustrative client accessing the "Electronic Catalog" 302. Because the display page 300 corresponds to a specific offered item, and the client may wish to browse to other offered items, navigation pane 306 is displayed. Navigation pane 306 contains links that enable a client to browse and select other items offered for acquisition from the electronic catalog system 120. Currently, the display page 300 depicts information for the novel "Anna Karenina," written by Leo Tolstoy, as reflected in display feature 310. The display feature 310 includes additional information, such as the identity of the translator, an average user rating (based on a number of reviews), the current price of the item, etc. Display features 308 and 312-322 reflect still more information regarding the item. Display feature 308, for example, is a graphic associated with the item. Display feature 312 reflects other formats of the item available from the electronic catalog system 120. Display feature 314 and 316 reflect primary acquisition options (e.g., purchasing from a preferred vendor) and secondary acquisition options (e.g., purchasing from additional vendors) respectively. Similarly, display features 318, 320, and 322 reflect a detailed description of "Anna Karenina," other items frequently acquired at the same time as "Anna Karenina," and detailed information regarding customer reviews for "Anna Karenina." Though illustrative display features regarding an item are discussed herein, one skilled in the art will appreciate that any combination of elements may be displayed within display page 300 without departing from the scope of the present disclosure.

Figure 3B:
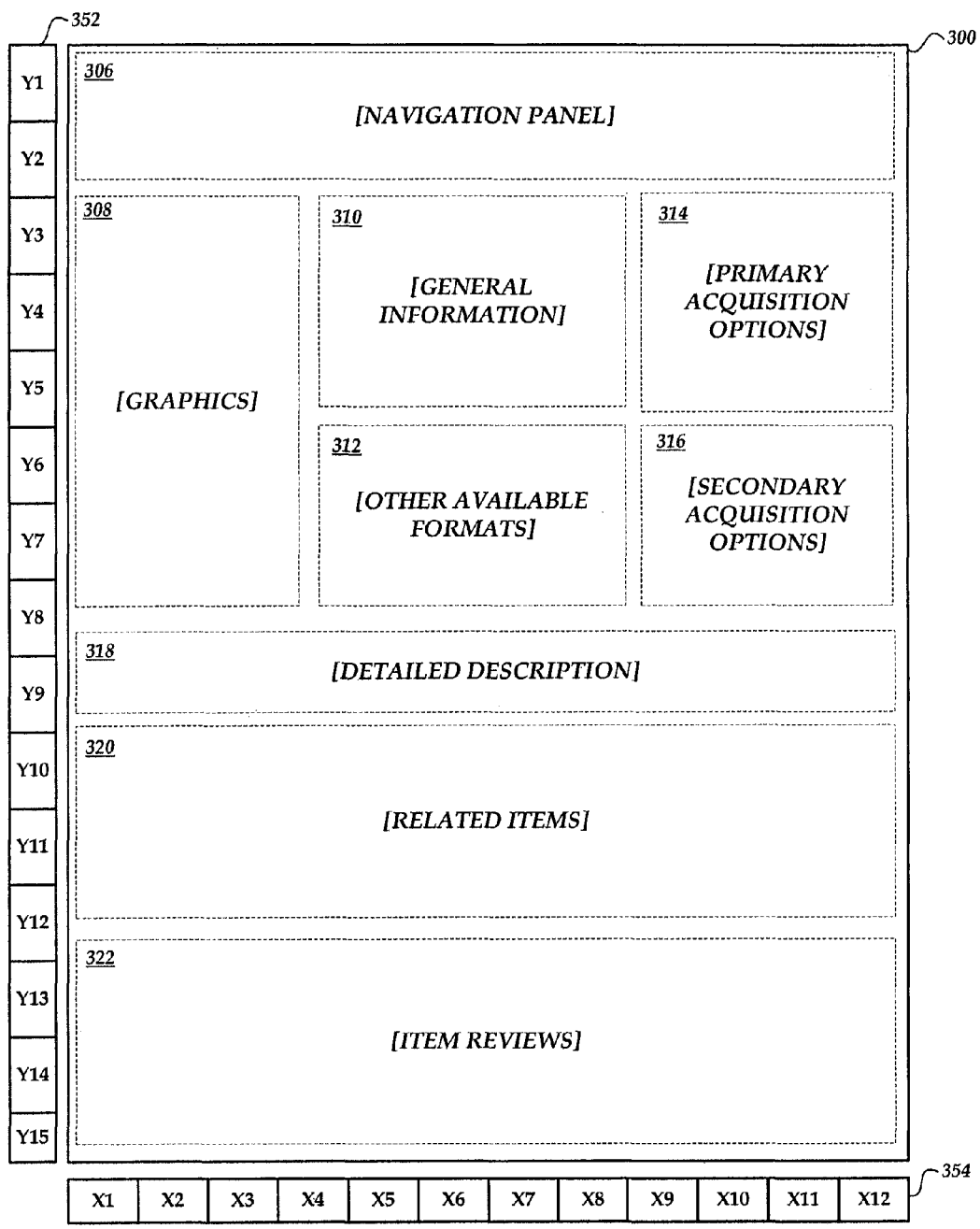
FIG. 3B is an alternate illustrative graphical representation or visualization of the content of FIG. 3A, including a representation or visualization of multiple horizontal portions and multiple vertical portions of the content that may be utilized to generate page-level usage data.

With reference to FIG. 3B, an alternate illustrative graphical representation or visualization of the content of FIG. 3A will be described. Specifically, FIG. 3B includes the display page 300 of FIG. 3A as modified to reflect display portions 306-322 in general terms. For example, display page 300 includes a navigation panel 306, graphics 308, general information 310, etc., as described above with respect to FIG. 3A. One skilled in the art will appreciate that while the display portions 306-322 of FIG. 3B are shown generically, they may not be displayed as such to a client. Rather, the display page 300 is utilized simply for illustrative purposes. In addition to display page 300, FIG. 3B further includes a depth gauge 352 reflecting multiple portions of the display page 300 as well as a width gauge 354. Specifically, the depth gauge 352 includes multiple depth indicators Y1-Y15. Each depth indicator is corresponds to the specific portion of the display page 352 sharing a vertical position with the depth indicator. For example, depth indicator Y1 corresponds to the upper portion of the navigation panel display feature 306; depth indicator Y2 corresponds to the lower portion of the navigation panel display feature 306; and depth indicator Y7 corresponds to a lower portion of the graphics display feature 308, the other available formats display feature 312, and the secondary acquisition options display feature 316. Similarly, the width gauge 354 includes multiple width indicators X1-X12. Each width indicator is corresponds to the specific portion of the display page 352 sharing a horizontal position with the width indicator. For example, width indicator X1 corresponds to the graphics display feature 308 (as well as additional elements within the same horizontal position); width indicator X5 corresponds to the general information panel 310 and the alternative formats panel 312 (as well as additional elements within the same horizontal position); and width indicator X9 corresponds to the primary acquisition options panel 314 and the secondary acquisition options panel 316 (as well as additional elements within the same horizontal position).

In accordance with aspects of the present disclosure, each depth indicator Y1-Y15 may represent a corresponding horizontal portion (which may alternatively be referred to as "slices" or "stripes") of the display page 300 for which page-level usage data is generated. Similarly, each width indicator X1-X12 may represent a corresponding vertical portion of the display page 300 for which page-level usage data is generated. In some embodiments, page-level usage data for portions a content item may be described with reference to either depth indicators (e.g., depth indicators Y1-Y15) or width indicators (.g., width indicators X1-X15). For example, page-level usage data may indicate that a client computing device 102 viewed portions of the display page 300 corresponding to each depth indicator from depth indicator Y1 to depth indicators Y7 (which may be referred to herein as "portion Y1," "portion Y2," etc.) for thirty seconds, and thereafter viewed portions Y5 through Y12 for 60 seconds. Accordingly, page-level usage data for the display page 300 may reflect that the client computing device 102 displayed portions Y5-Y7 (representing the overlap of the previous two portion ranges) for total of ninety seconds. Illustrative representations of page-level usage data (e.g., including references to depth indicators in order to refer to corresponding portions of a content item) will be described below with reference to FIG. 9. In some instances, utilization of horizontal portions may reduce the total amount of data necessary to represent page-level usage data. For example, multiple items of page-level usage data corresponding to an individual horizontal portion may be aggregated to simplify representation of the page-level usage data. Further, utilization of horizontal portions may reduce the processing power required to monitor interaction. For example, various interactions exclusively within a single horizontal portion may not be required to be reflected in the page-level usage data.

Figure 4A:
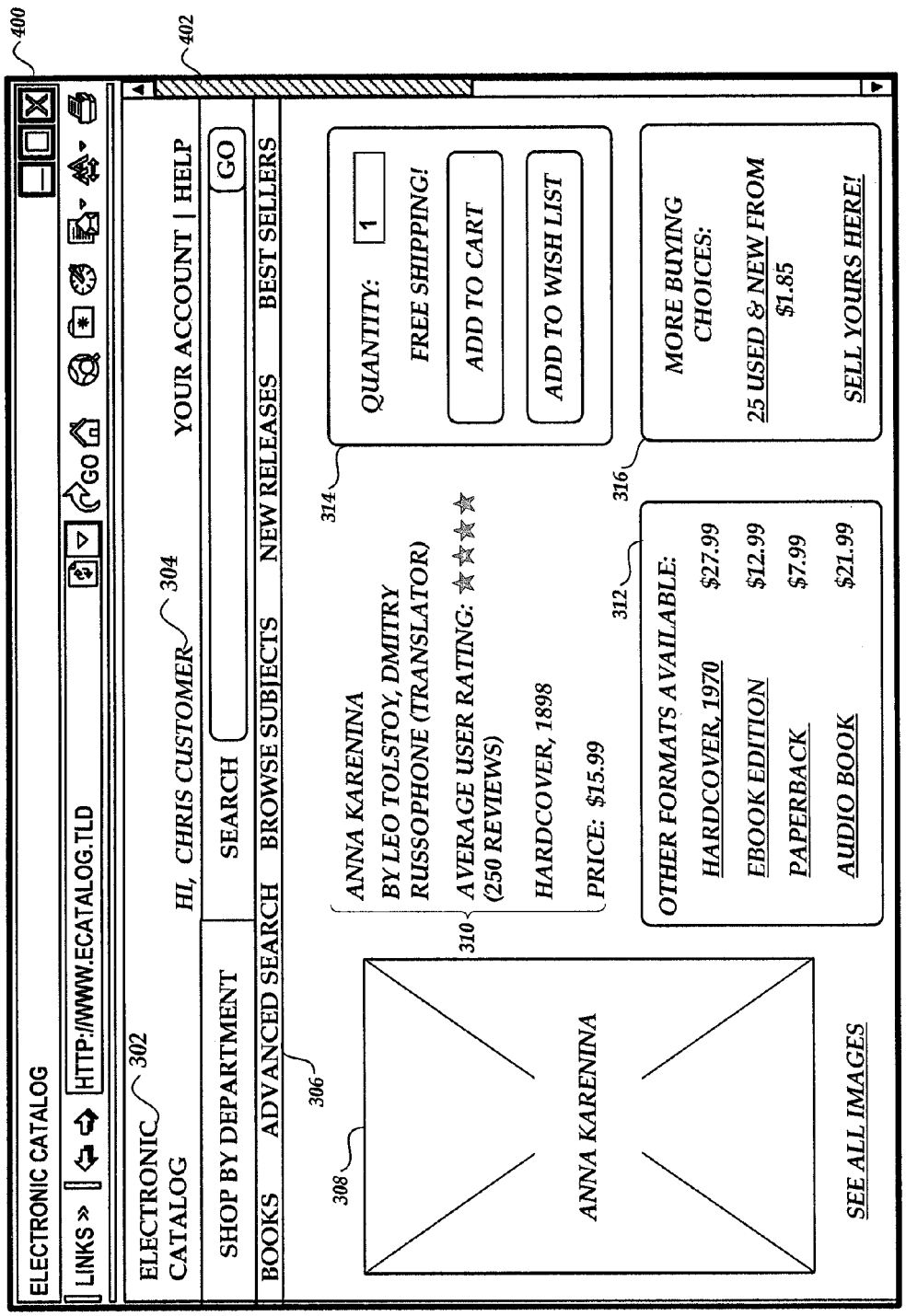
FIG. 4A depicts an illustrative user interface displayed on a client computing device that reflects a first portion of the content of FIG. 3A.
Figure 4B:
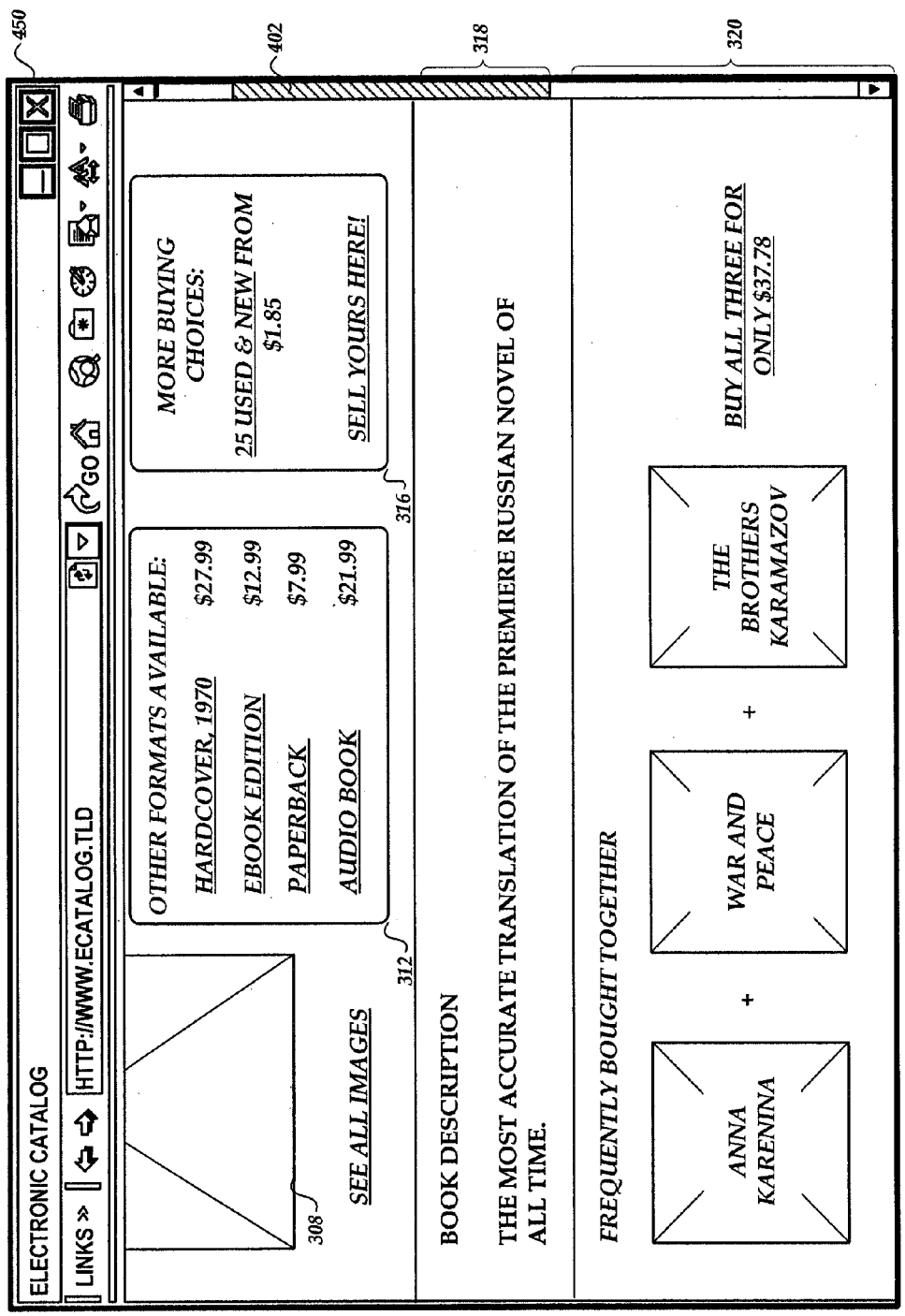
FIG. 4B depicts an illustrative user interface displayed on a client computing device that reflects a second portion of the content of FIG. 3A.

With reference now to FIGS. 4A and 4B, an illustrative user interface 400 displayed on a client computing device, such as client computing device 102 of FIG. 1, is depicted. Illustratively, the user interface 400 may be generated by an application (e.g., a web browser or a dedicated application on a mobile device) of the client computing device 102 in response to interaction with the electronic catalog system 120. While depicted in two figures, one skilled in the art will appreciate that the user interface 400 may be a single user interface and that the customer may view different portions of the interface by use of an interface input, such as scroll bar 402. For example, FIGS. 4A and 4B may represent the user interface 400 as presented to the client computing device 102 at two distinct points in time. Specifically, user interface 400 as depicted in FIG. 4A may represent a first portion of a content item, such as display page 300 of FIG. 3A, displayed by a client computing device 102 at a first point in time. Similarly, user interface 400 as depicted in FIG. 4B may represent a second (non-exclusive) portion of the display page 300 of FIG. 3A displayed by the client computing device 102 at a second point in time.

As noted above, FIG. 4A may represent the user interface 400 as output by the client computing device 102 at a first point in time, such as just after receiving information corresponding to the display page 300 of FIG. 3A. After receiving the display page 300, the client computing device 102 may load the uppermost portion of the display page 300 for output to a client. Because the display page 300 is larger than may be viewed on the viewport of user interface 400, only a portion of the display page 300 is shown. Specifically, the user interface 400 of FIG. 4A contains display features 302-316 of the display page 300. However, the user interface 400 of FIG. 4A does not include other display features of display page 300, such as display features 318-322.

Similarly, FIG. 4B may represent the user interface 400 as output by the client computing device 102 at a second point in time, such as after a client utilizes the scroll bar 402 to view the remained of display page 300. In response to use of the scroll bar 402, the client computing device 102 may modify the user interface to show an alternative portion of the display page 300. As noted above, because the display page 300 is larger than may be viewed on the viewport of user interface 400, only a portion of the display page 300 is shown. Specifically, the user interface 400 as shown in FIG. 4B contains display features 308, 312, and 316-320, but does not display other display elements, such as display elements 302-306, 310, 314, and 322.

Illustratively, during viewing of the user interface 400, the client computing device 102 (e.g., via a local interaction monitoring component 104) may monitor local interaction with the display page 300. Though multiple user interaction events may occur with respect to the display page 300 (as described above), scrolling of the user interface will be used as an illustrative example of such an event with respect to FIG. 4. Illustratively, at initially loading the page, the client computing device 102 may determine the portion of display page 300 viewed by the client. Illustratively, such a determination may include monitoring the size of the viewport (e.g., height and width of the viewport in pixels) as well as at least one coordinate position of the display page 300 within the viewport. For example, the client computing device 102 may determine that the output corresponds to a viewport 950 pixels wide and 450 pixels tall. The client computing device 102 may further determine that the upper left corner of the viewport corresponds to an X, Y coordinate position on the display page 300 of "0, 0" (where "0, 0" indicates the top left corner of the display page 300; X coordinates increase across the width of the display page 300; and Y coordinates increased across the height of the display page 300). Accordingly, the client computing device 102 may determine that a portion of the display page 300 output corresponds to coordinates "0, 0" (reflective of the top left corner of the viewport) to coordinates "950, 450" (the size of the viewport).

Thereafter, a client may utilize the scroll bar 402 to cause the user interface 400 to be modified as shown in FIG. 4B. Accordingly, the client computing device 102 may determine that, after such modification, the upper left corner of the viewport corresponds to an X, Y coordinate position on the display page 300 of "0, 300." In one embodiment, the client computing device 102 may also re-determine the size of the viewport of the user interface 400. In other embodiments, the client computing device 102 may utilize a previously determined viewport size. For purposes of simplicity, it will be assumed that in the current example, the viewport size remains at 950 pixels wide and 450 pixels tall. Accordingly, the client computing device 102 may determine that the portion of the display page 300 output corresponds to coordinates "0, 300" to coordinates "950, 750."

In one embodiment, the client computing device 102 may determine whether a user interaction event has occurred at each time period within a set of time periods. For example, the client computing device 102 may determine the currently output portion of the display page 300 at every 100 ms while the display page 300 is output. In this manner, timing information associated with output of the display page may be determined. For example, if the portion of the display page 300 remains as shown in FIG. 4A for ten 100 ms intervals, the client computing device 102 may determine that that portion of the display page 300 has been viewed for 1 second. In another embodiment, the client computing device 102 may determine whether a user interaction event has occurred in response to a trigger generated by the client computing device 102. Illustratively, an application outputting the user interface 400 may generate a trigger whenever a client scrolls the user interface 400. Accordingly, the client computing device 102 may determine whether a user interface event has occurred at every instance of such a trigger. One example of utilization of such a trigger may be to call a local interaction monitoring function in connection with the "window.onscroll" functionality implemented by multiple web browsers. In still more embodiments, monitoring of local interaction events may occur based on a combination of triggers and timing information. Illustratively, the client computing device 102 may utilize triggers (e.g., "onscroll" functionality) to determine whether a local interaction event has occurred, but do so no more frequently than a specified time period (e.g., 100 ms).

As described above, monitoring of local interaction events may be facilitated at least in part based on the horizontal or vertical portions (e.g., horizontal or vertical stripes) described with respect to FIG. 3B, above. For example, the client computing device 102 may determine that the portion of the display page shown in FIG. 4A corresponds to horizontal portions Y1 through Y8 as well as vertical portions X1 through X12 of FIG. 3B. Similarly, the client computing device 102 may determine that the portion of the display page shown in FIG. 4B corresponds to horizontal portions Y6-Y12 and vertical portions X1-X12. Accordingly, if a client were to utilize the scroll bar 402 to move from the user interface 400 as shown in FIG. 4A to the user interface 400 as shown in FIG. 4B, such interaction may be expressed as movement from a top position of horizontal stripe Y1 to a top position of horizontal stripe Y6 (and no movement with respect to the output of vertical stripes). Utilization of horizontal or vertical stripes may therefore reduce the complexity of the collected local interaction information when compared to expression with respect to individual pixels.

Though horizontal and vertical stripes are expressed with respect to monitoring of local interaction information, in some embodiments, monitoring of local interaction information may occur with respect to additional or alternative portions of a content item (e.g., predefined portions or elements within the content item). In certain embodiments, monitoring of local interaction information may occur with respect to stripes of other shapes and orientations (e.g., diagonal stripes). In other embodiments, monitoring of local interaction information may occur with respect to individual pixels of a content item. Furthermore, monitoring of local interaction information may be independent of processed page-level usage data. For example, local interaction information may reflect interaction with individual pixels or subpixels, while page-level usage data generated based on the local interaction information may be expressed with respect to horizontal and/or vertical stripes.

Figure 5:
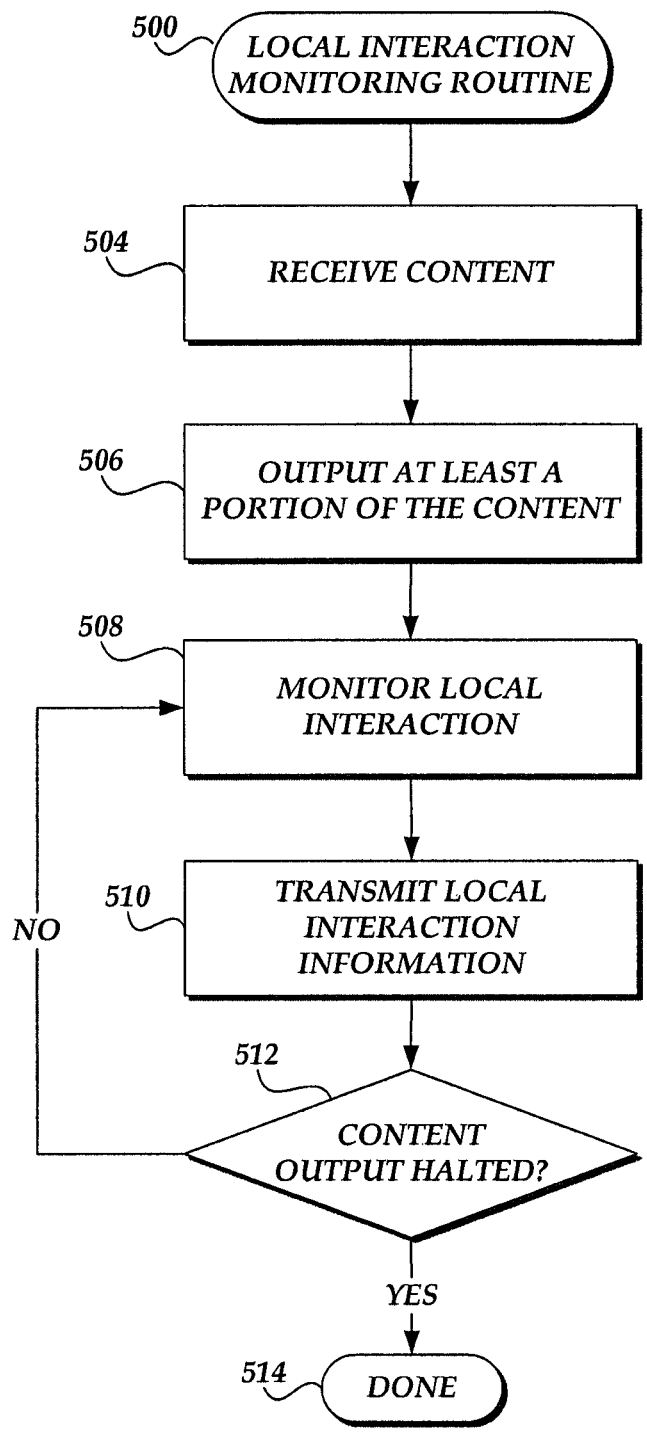
FIG. 5 is a flow diagram depicting an illustrative routine for monitoring local interaction information corresponding to interaction with content provided by the electronic catalog system of FIG. 1.

FIG. 5 is one example of an illustrative routine 500 for monitoring local interaction with content on a client computing device, such as client computing device 102 of FIG. 1. Specifically, at block 504, the client computing device 102 may receive content for output to a user. In one illustrative embodiment, the content may correspond to the display page 300 of FIG. 3A. For example, the content may be received at the client computing device 102 in response to interaction with the electronic catalog system 120 of FIG. 1. Thereafter, at block 506, at least a portion of the content may be output to a client at the client computing device 102. For example, the content may be displayed on a display screen of the client computing device 102. One illustrative user interface 400 for displaying at least a portion of content is described above with respect to FIGS. 4A and 4B.

Thereafter, at block 508, the client computing device 102 (e.g., via a local interaction monitoring component 104) may monitor local interaction with the content. As described above, in some embodiments, a local interaction monitoring component 104 may be implemented in whole or in part within a content item (e.g., by client-side scripting within a content item). Inclusion of all or a part of the local interaction monitoring component 104 may enable customization of gathered local interaction information based on the specific corresponding content item. For example, a first display page may implement a first local interaction monitoring component 104 configured to gather a relatively large amount of local interaction information as compared to a second local interaction monitoring component 104 within implemented by a second display page. As used herein, local interaction may generally correspond to any interaction with the displayed content or to any information corresponding to the output of the content on the client computing device 102. For example, local interaction may include the loading of the content on the client computing device 102, as well as information about the status of the content after loading (e.g., portion of the content displayed, the size of the viewport displaying content, etc.). Further, local interaction may include scrolling the content, modifying the size or shape of the output portion of the content, focusing or defocusing the content, or interacting with the content via a client input (e.g., keyboard, mouse, touch screen, etc.). As described above, in one embodiment, the client computing device 102 may monitor local interaction at each interval within a number of intervals. For example, the client computing device 102 may determine a set of local interaction information every 100 ms while content is displayed on the client computing device 102. In other embodiments, the client computing device 102 may determine local interaction information in response to a trigger caused by elements of the client computing device 102 (e.g., an event detected by a browser application and reported to the client computing device 102).

At block 510, the determined local interaction information may be transmitted to a remote device, such as the electronic catalog system 120 of FIG. 1. In one embodiment, transmission of local interaction information may be facilitated by "web beacons," as described above. Illustratively, the client computing device 102 may transmit a "web beacon" request to the electronic catalog system 120 for an arbitrary element (e.g., a 1 pixel by 1 pixel transparent image). The web beacon request may be formatted such that local interaction information is transmitted by virtue of the request itself. For example, the address from which the arbitrary element is requested may be formatted in order to convey local interaction information. Illustratively, utilization of web beacon style requests may enable transmission of the local interaction information while incurring relatively low processing costs, as compared to other transmission techniques. Though use of web beacons is described herein, transmission of local interaction information may take place via any number of known communication channels.

Thereafter, at block 512, the client computing device 102 may determine whether the content continues to be output (e.g., displayed by the client computing device 102). If the content is displayed, the routine 500 may return to block 508, where local interaction may be monitored, and information corresponding to the local interaction may be transmitted to the electronic catalog system 120. Alternatively, if output of the content has halted, the routine 500 may end at block 514.

Though elements of the routine 500 are described in linear order above, one skilled in the art will appreciate that blocks 504-512 may, in some instances, occur within a different sequence than as described above. For example, in one embodiment, transmission of local interaction information may occur at set intervals independent of local interaction monitoring (e.g., every 10 seconds). Accordingly, the sequence described above with respect to routine 500 is intended to be illustrative, and not limiting.

Figure 6:
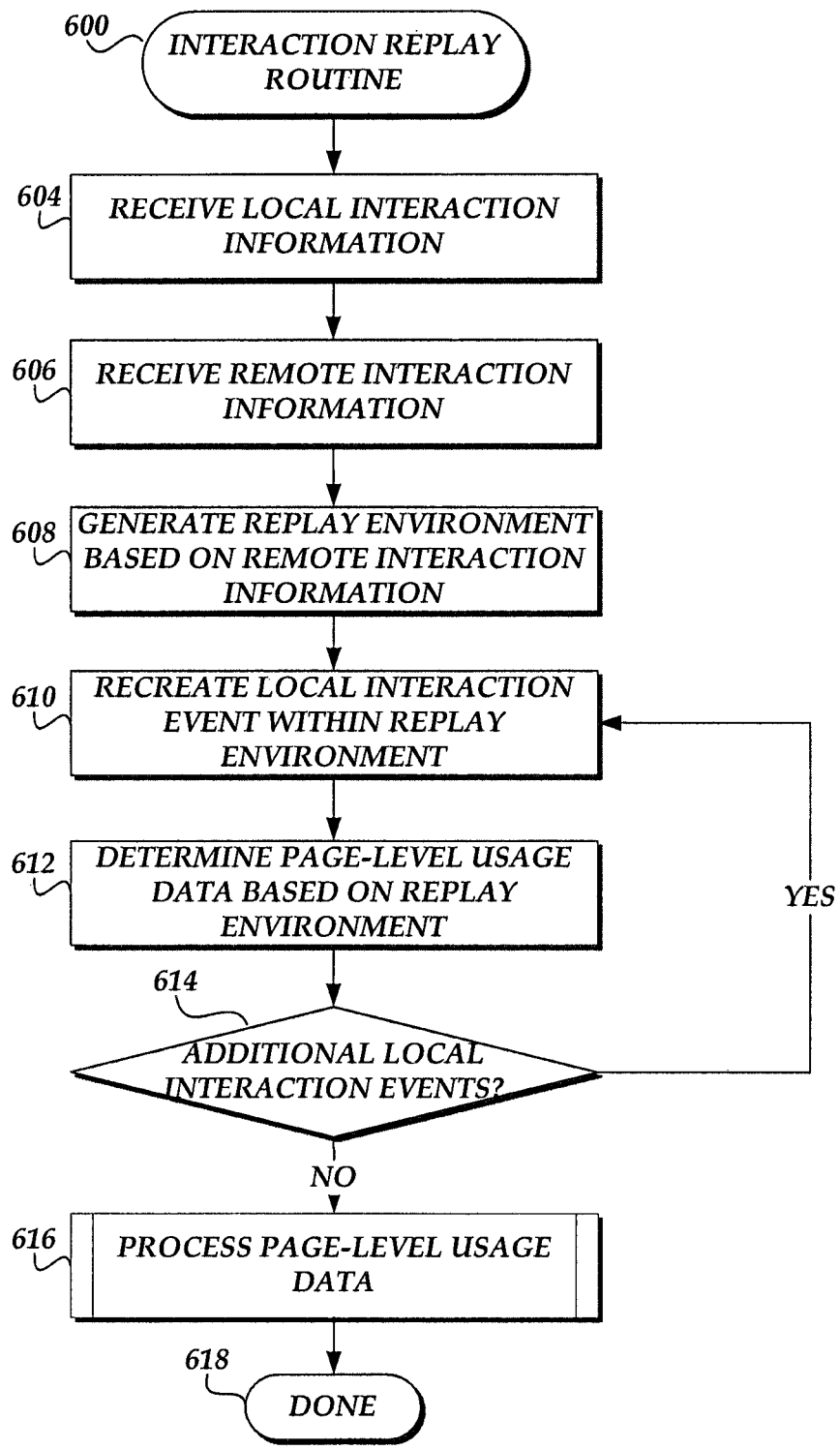
FIG. 6 is a flow diagram depicting an illustrative routine for generating page-level usage data based at least in part on local interaction information remote interaction information corresponding to interaction with content provided by the electronic catalog system of FIG. 1.

With reference now to FIG. 6, one illustrative routine 600 for generating page-level usage data corresponding to an item of content will be described. The routine 600 may be executed, for example, by the interaction replay component 132 of FIG. 1. In one embodiment, the routine 600 may be implemented immediately after the routine 500 of FIG. 5 (e.g., after receiving local interaction information corresponding to a content item). In another embodiment, the routine 600 may be implemented at any point subsequent to receiving local interaction information. For example, the routine 600 may be implemented once per hour by the interaction replay component 132, in order to process any previously received local interaction information. Moreover, though the routine 600 refers to generation of page-level usage data for a single interactive session (e.g., a single viewing of a web page), in some embodiments, the routine 600 may include generation of page-level usage data from multiple interactive sessions (e.g., multiple viewings of a web page by a single client computing device 102, or viewings of the web page by multiple client computing devices 102).

The routine 600 may begin at block 604, where local interaction information corresponding to a content item may be received. Illustratively, in one embodiment, the local interaction information may be received from a local interaction data store 128 of FIG. 1. In another embodiment, the local interaction information may be retrieved from alternative data stores, such as a log generated by the web server 126. As described above, local interaction information may include any information regarding the output of content on a client computing device 102, or interaction with the content. For example, the local interaction information may include information regarding the initial output of content (e.g., viewport size, portion of content displayed, etc.) as well as a set of local interaction events, such as scrolling the content, modifying the portion of content displayed, or other interaction with the content by a client.

At block 606, remote interaction information corresponding to the local interaction information may be received. Illustratively, in one embodiment, the remote interaction information may be received from a remote interaction data store 134 of FIG. 1.

In another embodiment, the local interaction information may be retrieved from alternative data stores, such as a log generated by the web server 126. Remote interaction information may generally refer to any information determined by the web server 126 regarding the output of content on the client computing device 102, or interaction with such content by the client computing device 102. Illustratively, remote interaction information may include an identifier of the content output on the client computing device 102 (e.g., a URL accessed by the client computing device 102), an identifier of the client computing device 102 (e.g., where the content may be modified based on the identity of the client computing device 102), or other information regarding the activity of the client computing device 102. In some instances, remote interaction information may include "clickstream data" reflective of a client computing devices 102 activity on the electronic catalog system 120.

At block 608, the interaction replay component 132 may utilize the received remote interaction information to generate a replay environment for determining page-level usage data based on the local and remote interaction information. In one embodiment, a replay may include a web browser or web browser analog (e.g., a simulated web browser) capable of reproducing the content corresponding to the local and remote interaction information. For example, in one embodiment, the interaction replay component 132 may load the content (as identified within the remote and/or local interaction information) within a web browser. In some embodiments, functionality typically associated with a web browser may be omitted from the replay environment. For example, the replay environment may not be required to output the content (e.g., via a display), or to enable physical interaction via input devices (e.g., keyboard, mouse, touchscreen). Omission of such elements may substantially reduce the processing requirements of the replay environment.

The replay environment may generally include the content corresponding to the local and remote interaction information. For example, the replay environment may generate a viewport (which may or may not be actually output) corresponding to the size of the viewport of a client computing device 102 associated with the local and remote interaction information. The replay environment may further modify the content as necessary to approximate the content as viewed by the client computing device 102. For example, in embodiments where the format of content is modified based on a status of a client (e.g., a preferred client, a known client, an anonymous client), the replay environment may generate or determine content corresponding to the status of the client computing device 102 associated with the local and remote interaction information.

At block 610, the interaction replay component may utilize the generated replay environment to determine page-level usage data corresponding to the local and remote interaction information. Illustratively, in one embodiment, the local interaction information may reflect as series of local interaction events occurring on the client computing device 102. For example, the local and remote interaction information may reflect that the client began viewing a top portion of the page at initial loading of the content, scrolled 200 pixels six seconds after loading the content, scrolled another 800 pixels ten seconds after loading the content, etc.

Accordingly, at block 610, one or more of such local interaction events may be replayed or recreated within the replay environment. Illustratively, the interaction replay component 132 may, after six seconds, scroll the content within the replay environment 200 pixels. Thereafter, at block 612, page-level usage data may be generated based on the replay environment. In general, page-level usage data may include any data capable of being determined based on local and remote interaction information. One example of page-level usage data is whether a client computing device 102 outputs a portion of a content item for at least a threshold amount of time. For example, an "impression" may be recorded with respect to a portion of a content item if that portion was output by the client computing device for at least one second. Further examples of page-level usage data may include whether a portion of content was output by a client computing device 102 and the total amount of time a portion of content was output by a client computing device 102. Yet another example of page-level usage data may include scroll velocity recorded with respect to each portion of a content item. Scroll velocity may generally reflect the average scrolling speed recorded during output of a portion of a content item. Illustratively, if average scrolling speed is very high with respect to a portion of a content item, it may reflect that clients tend to scroll past the portion quickly.

Conversely, a low scrolling velocity may indicate that clients tend to dwell on a portion of a content item.

In some embodiments, local and remote interaction information may be incomplete. For example, in embodiments where local interaction information is recorded only every 100 ms, information as to interaction within those 100 ms may be unavailable. However, in some embodiments, the interaction replay component 132 may be configured to infer page-level usage data occurring between records of local interaction information. For example, if a first content portion is output at 100 ms, and a second content portion is output at 200 ms, the client may be inferred to have moved between content portions during that time. Accordingly, the client may also be inferred to have viewed any portion of content intervening between the first and second content portion (albeit for a limited duration).

After determining page-level usage data based on a previous local interaction event, the routine 600 may determine whether any additional local interaction events exist within the local interaction information. If so, the routine 600 may return to block 610 to replay the local interaction event and determine page-level usage data based on the local interaction event, as described above.

Thereafter, the routine 600 may continue at block 616, where the determined page-level usage data may be processed to facilitate storage and retrieval. One illustrative routine processing page-level usage data will be described in more detail below with respect to FIG. 8. Thereafter, the routine 600 may end at block 618.

Though the routine 600 is described above as replaying local interaction events precisely, in some embodiments, local interaction events may be modified in order to facilitate generation of page-level usage data. For example, in some embodiments, timing information (such as time periods between local interaction events) may be modified proportionally in order to reduce the total time needed to replay the local interaction events. For example, a delay of six seconds between two local interaction events may be reduced to 6 ms when recreated during the routine 600, and the page-level usage data may be calculated to account for such a reduction. In other embodiments, timing information may not be utilized for the recreation of local interaction information. For example, local interaction events may be recreated within the routine 600 as quickly as possible (e.g., without imposing a delay). In such embodiments, page-level data may be calculated based on the original timing information within the local and remote interaction information. Furthermore, one skilled in the art will appreciate that, while the routine 600 was described sequentially above, elements of the routine 600 may be implemented simultaneously or in a different sequence. For example, in one embodiment, processing of page-level usage data may occur at each determination of page-level usage data (e.g., subsequently to block 612). In other embodiment, processing of page-level usage data may occur separately from the routine 600 (e.g., at every hour, independent of implementation of the routine 600).

As described above, it may be beneficial for clients to view page-level usage data corresponding to content across a range of time periods. For example, it may be beneficial to record the total number of times a portion of a content item is viewed by any user within a given month. However, the format in which page-level usage data is stored may affect the ease by which page-level usage data across time periods may be returned. Accordingly, page-level usage data may be processed in order to conform to a number of formats.

Figure 7:
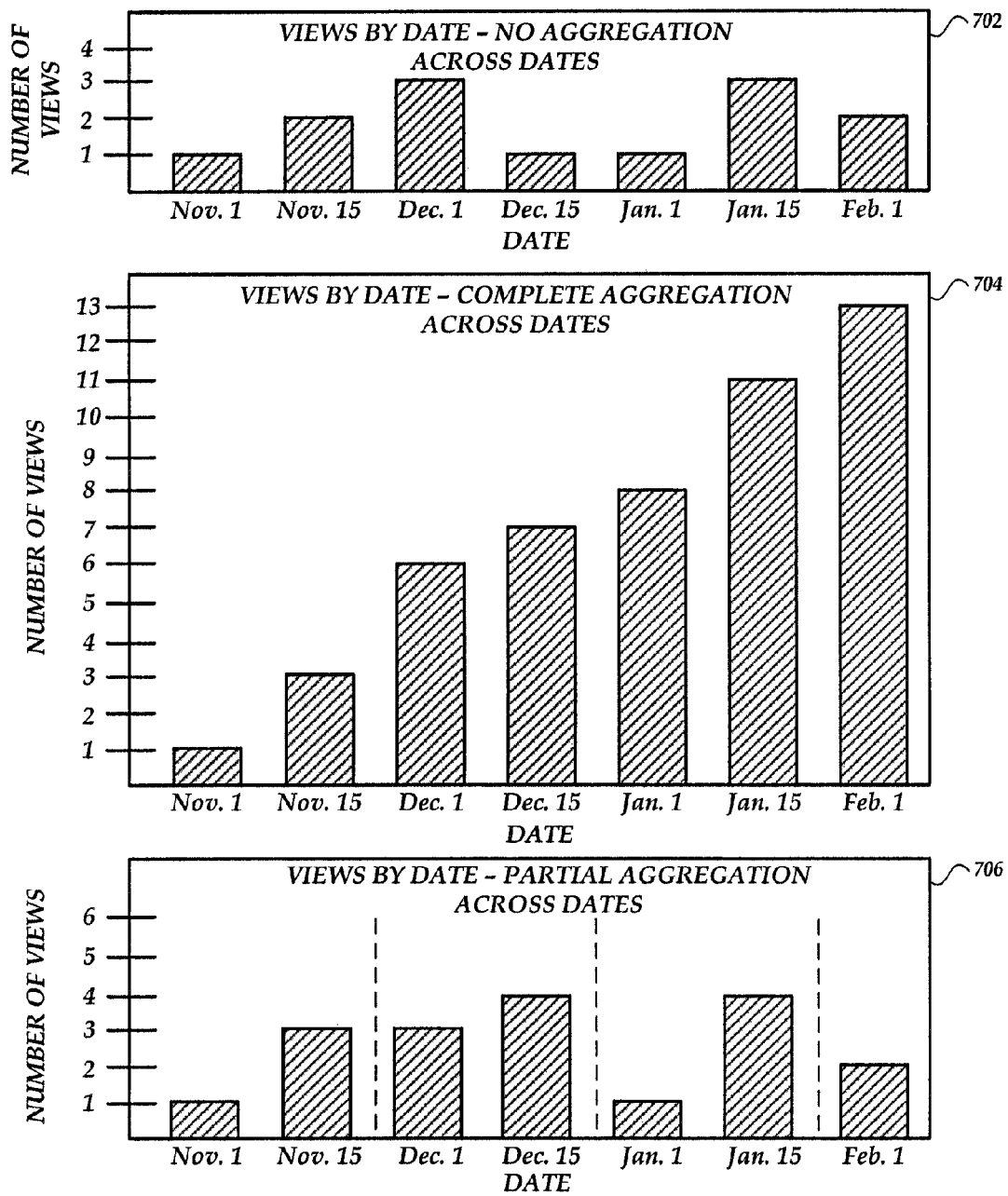
FIG. 7 is an illustrative graphical representation or visualization of page-level usage data displayed or stored according to a number of formats, as may be generated by the electronic catalog system of FIG. 1.

Specifically, with reference to FIG. 7, illustrative visualizations or representations of page-level usage data stored according to a number of various formats will be described. Illustratively, each of the representative graphs 702-706 may reflect page-level usage data for a specific portion of a content item across a period beginning Nov. 1, 2012 and ending Jan. 1, 2013 (e.g., within multiple session and/or by multiple clients). For the purposes of the present example, graphs 702-706 may reflect the number of views of portion Y1 of the display page 300 of FIG. 3B by all client computing devices accessing the electronic catalog system 120. Specifically, graph 702 may represent views of the portion Y1 stored according to a first format, which individually records the total views of portion Y1 occurring each half-month. Accordingly, as shown in graph 702, portion Y1 received one total view during the first half of November, and 2 total views during the second half of November. Similarly, portion Y1 received 3 total views during the first half of December, and 1 total view during the second half of December. Though illustrative values are utilized in graphs 702-706, one skilled in the art will appreciate that any value may be reflected in page-level usage data. Further, though a small number of data points are reflected in graphs 702-706, any number of data points are possible (e.g., data for each hour, each day, each month, etc.)

With respect to the graph 702, a total number of views of portion Y1 occurring during a time range between November 1 and February 1 may be determined by aggregating the number of views occurring during each data point within the range. For example, the total number of views from November 15 to December 15 (non-inclusive) may be determined by adding the number of views during the second half of November with the number of views during the first half of December. However, where the desired time period range is large compared to the granularity of individual time period data, determining total page-level usage data for the time period range may require a large number of operations (e.g., to sum each individual item of page-level usage data). For example, where a number of views of portion Y1 were recorded with respect to each day, and the aggregate views of portion Y1 across a year is requested, 365 operations would be required to retrieve the information (where an operation corresponds to a retrieval of information of individual day).

In order to address the large number of operations required to determine page-level usage data across a time range, the format of graph 702 (described above) may be modified in according to a second format, as shown in graph 704. Specifically, each time period (as represented in graph 704) may be calculated in order to reflect the number of views of portion Y1 (e.g., by all client computing devices 102) during the time period in aggregate with the number of views of portion Y1 during a past time period. Accordingly, the graph 704 reflects that portion Y1 of display page 300 received one view during the first half of November, three pages views during both the first and second halves of November, six views during all of November and the first half of December, etc. Accordingly, page-level usage data for a given time period range may be determined by subtracting the page-level usage data of the last date prior to the time period range from that of the ending date. Accordingly, the number of views of portion Y1 from December 1 to January 15 may be determined by subtracting the views of portion Y1 as of the second half of November (e.g., reflective of views until November 31) from the views as of January 15. Accordingly, even where the desired time period range is large compared to the granularity of individual time period data, returning page-level usage data for a time period range requires only two operations: a first operation to retrieve aggregate page-level data prior to the desired time-period range, and a second operation to retrieve aggregate page-level data corresponding to the end of the desired time-period range. Illustratively, where page-level usage data is recorded daily, the aggregate page-level usage data across the year 2012 may be determined by subtracting the value of the page-level usage data as of Dec. 31, 2011 from the value of the page-level usage data as of Dec. 31, 2012. However, by reflecting all prior page-level usage data within the page-level usage data for a given date, errors in data may be promulgated indefinitely. For example, an error in page-level usage data for the first half of January would be reflected in the page-level usage data for the second half of January, the first half of February, etc.

In order to address the issues discussed above with respect to graphs 702 and 704, the format these graphs may be modified in according to a third format, as shown in graph 706. Specifically, each time period (as represented in graph 706) may be calculated to reflect the number of views of portion Y1 during the time period in aggregate with all views of portion Y1 previously occurring during the same month. For example, the graph 706 reflects that portion Y1 of display page 300 received one view during the first half of November, three views during both the first and second halves of November, three views during the first half of December, four views during both the first and second halves of December, etc. Each instance of a dotted line within graph 706 (between each full month) may be referred to as a "breakpoint," such that data prior to the breakpoint is not reflected in data subsequent to the breakpoint. By storing each month's view information in aggregate, the total number of operations required to return a number of views across a time period may be reduced. However, due to the use of breakpoints, errors occurring within a given month will not propagate outside of the month. Accordingly, the format represented by graph 706 may reflect advantages of both of the previously discussed formats, while minimizing the disadvantages of those formats.

Illustratively, where page-level usage data is stored according to the "partial aggregation" format of graph 706, the number of operations required to return a specified range of page-level usage data may be dependent on the number of breakpoints (e.g., months) within the specified range. For example, a request to determine views of portion Y1 during a given year would require twelve operations (in order to retrieve and sum values reflected of the number of views of each of twelve months). Where a beginning portion of a month is included in a time range, only a single operation is needed to account for the partial month (e.g., to retrieve page-level usage data as of the last date within the portion of the month). Similarly, where an ending portion of a month is included in a time range, two operations are needed to account for the partial month (e.g., to retrieve page-level usage data as of the first date within the portion of the month and as of the last date of the month). Accordingly, the maximum number of operations required to determine page-level usage data for any date range (where breakpoints correspond to each month) may be determined as the number of complete months within the date range, plus three. Such a maximum number of operations represents a substantial improvement on the number of operations required by the format of graph 702, while still reducing the propensity of errors to propagate. A further advantage of the format of graph 706 may be the disassociation between operations required to return page-level data for a given time period, and the granularity at which page-level data is recorded. For example, page-level usage data may be stored for every day, every hour, or every minute without modifying the number of operations required to return data corresponding to a given time period.

While the formats described above with respect to FIG. 7 generally refer to page-level usage data corresponding to a single portion of a content item, in some embodiments, page-level usage data corresponding to multiple portions of a content item, or to portions of multiple content items may be aggregated and stored. For example, in one embodiment, page-level usage data may be determined for all content items within a specific category of content items. Illustratively, a first display page for the novel "Anna Karenina" and a second display page for the novel "Crime and Punishment" may both be categorized as "books." Accordingly, page-level usage data for portion Y1 of "Anna Karenina" may be aggregated with page-level usage data for a corresponding portion of "Crime and Punishment." By aggregating usage data across multiple content items within a category, client's averaged interactions with all content items within the category may be monitored. Specifically, the electronic catalog system 120 may determine that while portions Y1-Y8 of "book" content items are viewed commonly, client computing devices rarely output portions Y12-Y15 of "book" content items.

Moreover, in some instances, page-level usage data may be distinguished based on characteristics of a client or a client's interactions with a display page. Illustratively, some clients of the electronic catalog system 120 may be associated with an "elite" status level. Accordingly, for a given content page (or set of content pages), a first set of page-level usage data may be generated based on actions taken by "elite" clients, while a second set of page-level usage data may be generated based on actions taken by "non-elite" clients. Similarly, page-level usage data may be distinguished based on a client's actions with respect to a specific content item. For example, a first set of page-level usage data may be generated for all clients who utilized a content item to make a purchase, while a second set of page-level usage data may be generated for clients who do did make a purchase.

Figure 8:
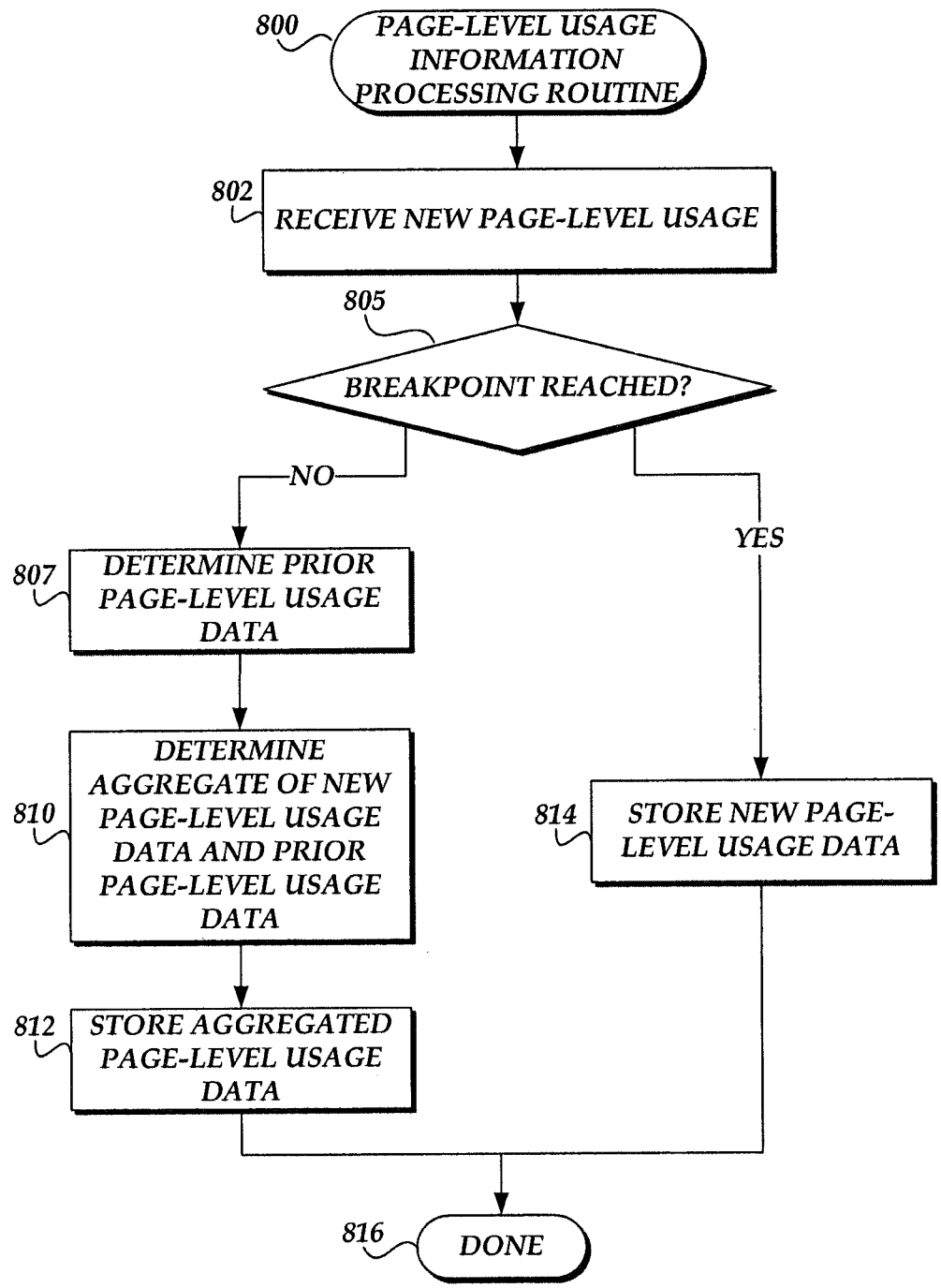
FIG. 8 is a flow diagram depicting an illustrative routine for processing page-level usage data according to a partially aggregated format, as may be implemented by the electronic catalog system of FIG. 1.

With reference to FIG. 8, one illustrative routine 800 for processing page-level usage data according to a partial aggregation format will be described. The routine 800 may be implemented, for example, by the interaction replay component 132 of FIG. 1. Though a page-level usage data corresponding to a single aspect of a single portion of a content item (e.g., views of portion Y1 of the display page 300 of FIG. 3A) will be described, the routine 800 may be implemented with respect to multiple aspects of a portion of a content item, or multiple portions of a content item. Moreover, the interaction replay component 132 may implement multiple instances of the routine 800 (e.g., in parallel or serial) in order to process multiple aspects of page-level usage data.

The routine 800 may begin at block 802, where newly generated page-level usage data may be received (e.g., page-level usage data that has not yet been processed according to the routine 800). For example, the interaction replay component 132 may receive page-level usage data indicating that portion Y1 of the display page 300 was viewed 500 times on Dec. 15, 2012. At block 805, the interaction replay component 132 may determine whether the newly received page-level usage data represents a breakpoint. As described above, a breakpoint may generally correspond to a time point at which new page-level usage data is not aggregated with previous page-level usage data. For example, in one embodiment, breakpoints may be set at the beginning of each month, such that page-level usage data corresponding to each day within a month is reflective of all corresponding page-level usage data since the beginning of the month. Within the present example, because the newly acquired page-level usage data does not correspond to the first day within a month, the routine 800 may continue at block 810, where the interaction replay component 132 may determine any existent prior page-level usage data. In some embodiments, prior page-level usage data may be the result of prior implementations of routine 800. Illustratively, prior page-level usage data may be included within the page-level usage data store 136. The prior page-level usage data may reflect, for example, that portion Y1 was viewed 1250 times from Dec. 1, 2012 through Dec. 14, 2012.

Thereafter, at block 810, the aggregate of the newly acquired page-level usage data and the previously stored page-level usage data is determined. Specifically, the interaction replay component 132 may then determine that, in aggregate, portion Y1 has been viewed 1750 times from Dec. 1, 2012 through Dec. 15, 2012. The determined aggregated page-level usage data may then, at block 812, be stored as a value for the currently processed date, Dec. 15, 2012. Illustratively, storage of the aggregated page-level usage data may be facilitated by the page-level usage data store 136. The routine 800 may then end at block 816.

In an alternate embodiment, breakpoints may be set at the first and fifteenth of each month. Accordingly, returning the example above, the interaction replay component 132 would determine at block 805 that the currently processed date, Dec. 15, 2012 does correspond to a breakpoint. The routine 800 would therefore continue at block 814, where the new page-level usage data may be stored. Illustratively, the interaction replay component 132 may store a value of 500 views as the page-level usage data for Dec. 15, 2012. As described above, storage of the aggregated page-level usage data may be facilitated by the page-level usage data store 136. Thereafter, the routine may end at block 816.

Figure 9:
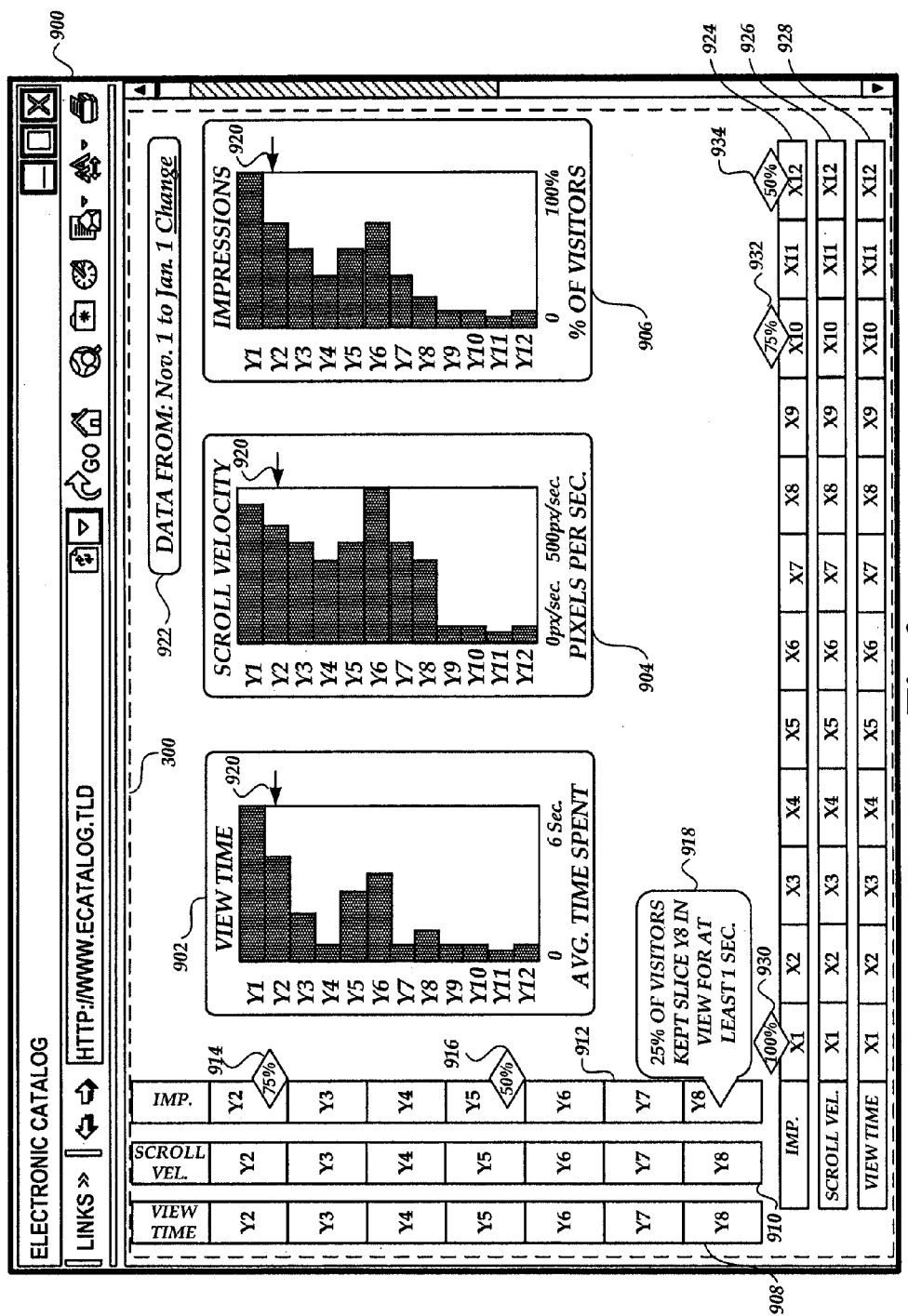
FIG. 9 depicts an illustrative user interface displayed on a client computing device that reflects page-level usage data for content available from the electronic catalog system of FIG. 1.

With reference to FIG. 9, an illustrative user interface 900 for representing page-level usage data corresponding to a content item is depicted. Illustratively, the user interface 900 may be generated by an application (e.g., a web browser) of the client computing device 102 in response to interaction with the electronic catalog system 120. In some embodiments, the access to the user interface 900 may be restricted, such that only client computing devices 102 authorized by the electronic catalog system may view the user interface 900.

Specifically, the user interface 900 may include a number of display elements 902-934 (which will be described in more detail below) overlaid on top of a portion of display page 300 (described in more detail above with respect to FIGS. 3A-3B). Though not shown in detail in FIG. 9 for the sake of clarity, one skilled in the art will appreciate that the portion of the display page 300 included within user interface 900 may include any of the display elements 302-322 of FIG. 3A. In the present example, the portion of the display page 300 included within user interface 900 may include at least horizontal stripes Y2-Y10, as described with respect to FIG. 3B, above.

In addition, the user interface 900 includes one or more graphs 902-906 and one or more gauges 908-912 and 924-928, each reflective of an aspect of page-level usage data for the display page 300. Specifically, each of the graphs 902-906 and gauges 908-912 and 924-928 reflect page-level usage data corresponding to interaction with the display page 300 from Nov. 1, 2012 to Jan. 1, 2013. The user interface 900 includes display element 922 reflecting this date range. Further, display element 922 may be selectable by a client in order to modify the date range, and therefore graphs 902-906 and gauges 908-912 and 924-928.

With reference to graphs 902-906, information regarding three distinct aspects of page-level usage data is displayed. Specifically, graph 902 reflects the view time of each horizontal stripe Y1-Y12 of the display page 300. For example, the graph 902 reflects that, on average, clients viewing the display page 300 between Nov. 1, 2012 and Jan. 1, 2012 have viewed horizontal stripe Y1 for 6 seconds. Similarly, the graph 902 reflects that, on average, clients viewing the display page 300 between Nov. 1, 2012 and Jan. 1, 2012 have viewed horizontal stripe Y2 for slightly less time (e.g., 4 seconds). Each additional horizontal stripe Y3-Y12 is similarly reflected in the graph 902. Accordingly, a client viewing the user interface 900 may readily discern page-level usage data corresponding to display page 300 from the graph 902. Further, the graph 902 may include an indicator 920 indicative of the position within the graph 902 corresponding to the portion of the display page 300 currently included within the user interface 900. For example, the indicator 920 shows that the user interface 900 is currently displaying the portion of display page 300 beginning from horizontal stripe Y1. The indicator 920 may indicate different portions of the graph 902, based on client interaction with the user interface 900. For example, if a client were to scroll the user interface 900 in order to display a second portion of the display page 300, the indicator 920 would then reflect a position within the graph 902 indicative of page-level usage data for the second portion of the display page 300. Accordingly, a client viewing the user interface 900 may readily discern the page-level usage data which corresponds to a currently viewed portion of content.

In some embodiments, graphs 902-906 may be selectable by a user in order to navigate the display page 300. For example, user selection of the portion of graph 902 corresponding to horizontal stripe Y6 may modify the user interface 900 in order to display the portion of display page 300 beginning from horizontal stripe Y6. Accordingly, the graphs 902-906 may enable rapid navigation of the display page 300 based on displayed page-level usage data. Still further, though horizontal strips Y1 through Y12 are displayed in FIG. 9, graphs 902-906 may include page-level usage data corresponding to any portion of the display page 300 or to all portions of the display page 300. Moreover, in some embodiments, graphs 902-906 may include page-level usage data corresponding to historical horizontal portions of the display page 300 that are not currently included within the display page 300. For example, as described above, the display page 300 may be dynamic, such that the content of the display page 300 is modified over time. Accordingly, in some embodiments, content of the display page 300 may be modified, hidden, or reduced, such that the total number of horizontal stripes within the display page 300 is also reduced. However, page-level usage data may have been generated for the no longer existent horizontal stripes. Accordingly, in some embodiments, the graphs 902-906 may reflect page-level usage data for historical horizontal stripes that are not presented within the display page 300.

Graphs 904 and 906 similarly show aspects of page-level usage data. Specifically, graph 904 reflects the average scroll velocity of clients viewing the display page 300 over each horizontal slice Y1-Y12. For example, as shown in graph 904, scroll velocity of clients was highest at horizontal slice Y6, reaching 500 pixels per second. Average scroll velocity with respect to each other horizontal slice may also be determined based on the graph 904. Similarly, graph 906 reflects the percentage of clients viewing the display page 300 that kept each horizontal slice within view for at least a threshold amount of time (e.g., 1 second). For example, graph 906 reflects that 100% of clients kept horizontal slice Y1 in view for at least one second, while 75% of clients kept horizontal slices Y2 and Y6 in view for at least one second, and a substantially lower percentage of clients kept slices Y9-Y12 in view for at least one second. Graphs 904 and 906 further include indicators 920 (described above), which indicate a portion of the graphs 904 and 906 indicative of page-level usage data for the portion of the display page 300 currently included within the user interface 900.

Though graphs 902-906 are described above with respect to page-level usage data for horizontal stripes Y1-Y12, in some embodiments, graphs 902-906 may be modified (or additional graphs may be displayed) to reflect page-level usage data for additional or alternative portions, such as vertical stripes X1-X12. In some embodiments, page-level usage data for both horizontal stripes Y1-Y12 and vertical stripes X1-X12 may be displayed concurrently, such as by use of a "heat map." As used herein, heat maps refer to a two dimensional graphical representation of data within a matrix. For example, graph 902-906 may, in some embodiments, depict data for each intersection of horizontal stripes Y1-Y12 and vertical stripes X1-X12. In some such embodiments, each data point (representative of an intersection of a horizontal stripe and a vertical stripe) may be colored, shaded, or otherwise varied in order to show page-level usage data for the intersection (e.g., with a higher percentage data point being represented by a darker color and a lower percentage data point being represented by a lighter color). Graphs 902-906 may therefore represent page-level usage data for set of portions of the display page 300 according to a number of different formats.

The user interface 900 further includes gauges 908-912 and 924-928. In contrast to graphs 902-906, which may reflect page-level usage data for the entirety of a display page 300, gauges 908-912 and 924-928 of FIG. 9 reflect page-level usage data corresponding to the portion of display page 300 that is included within the user interface 900. Specifically, gauges 902-906 reflect page-level usage data for portions Y2-Y10 of display page 300, while gauges 924-928 reflect page-level usage data for portions X1-X12. Moreover, gauges 902-906 may continue to be reflective of a currently displayed portion of the display page 300, even after altering the viewed portion. For example, as the user scrolls the display page 300, the gauges 902-906 may be modified to reflect the currently viewed portion of display page 300. Moreover, each portion of the gauges 902-906 and 924-928 (labeled as Y2-Y10 and X1-X12, respectively) corresponds to a corresponding slice (e.g. horizontal slice Y2-Y10 or vertical slice X1-X12) of the display page 300. Accordingly, page-level usage data for each horizontal and vertical slice is displayed simultaneous with the respective horizontal or vertical slice. One or more portions of gauges 902-906 and 924-928 may include data indicators reflective of page-level usage data for a corresponding portion. For example, data indicators 914 and 916 reflect impressions of horizontal slices Y2 and Y5, respectively; while data indicators 930, 932, and 934 reflect impressions of the vertical slices X1, X7, and X12, respectively. Each data indicator may reflect page-level usage data of a corresponding horizontal slice of the display page 300. For example, data indicator 914 reflects that 75% of clients viewed horizontal stripe Y2 for at least one second, while data indicator 916 reflects that 50% of clients viewed horizontal stripe Y5 for at least one second. Similarly, data indicators 930-934 reflect that 100 percent, 75 percent, and 50 percent of clients viewed vertical stripes X1, X10, and X12, respectively, for at least one second. Though five data indicators are shown in FIG. 9, any number of data indicators may be included without departing from the scope of the present disclosure. For example, in one embodiment, each portion of each gauge 902-906 and 924-928 may include a data indicator.

Gauges 908-912 may further be configured to display additional information on client selection (e.g., selection via keyboard or mouse pointer). For example, display feature 918 may be output in response to user selection of portion Y8 of gauge 912. Display feature 918 may show additional page-level usage data corresponding to the selected portion. For example, selection of portion Y8 of gauge 912 (displaying impression data) may cause output of display feature 916, indicating that 25% of clients viewed horizontal stripe Y8 for at least one seconds. Though not shown in FIG. 9, display feature 918 may include additional page-level usage data, such as an average viewport size of clients.

Accordingly, by use of graphs 902-906 and gauges 908-912 and 924-928, page-level usage data corresponding to a content item may be output in conjunction with that content item. Though graphs 902-906 and gauges 908-912 and 924-928 are described herein as overlaying content items, in other embodiments, graphs 902-906 and gauges 908-912 and 924-928 may be displayed in different manners (e.g., as a sidebar). Moreover, in some embodiments, graphs 902-906 and gauges 908-912 and 924-928 may be displayed independently of a content item. Still further, though illustrative examples of representation of page-level usage data are described above with respect to graphs 902-906 and gauges 908-912 and 924-928, any representation of such page-level usage data may be included within the graphs 902-906 and gauges 908-912 and 924-928. For example, graphs 902-906 and gauges 908-912 and 924-928 may represent page-level usage data as absolute values (e.g., number of viewers of a portion of the display page 300) or percentiles (e.g., percent of users who viewed a portion of the display page 300). In some embodiment, graphs 902-906 and gauges 908-912 and 924-928 may be color coded (e.g., graph 902 may be colored similarly to gauge 908, etc.) in order to increase readability.

Though illustrative examples of display of page-level usage data are described above with respect to FIG. 9, additional or alternative display elements may further be included within the user interface 900. In one embodiment, each portion of the display page 300 itself may be modified in order to reflect page-level usage data for the portion. For example, though not shown in FIG. 9, each horizontal portion Y1-Y15 may be shaded or colored based on page-level usage data for the corresponding horizontal portion (e.g., a high average view time of a portion by clients may be result in darker shading, while a low average view time may result in lighter shading). Similarly, each vertical portion X1-X12 may be shaded or colored based on page-level usage data for the corresponding vertical portion. Accordingly, the darkness of each portion (or intersection thereof) may be reflective of page-level usage data for the portion).

In another embodiment, gauges 908-912 and 924-928 may be responsive to user input device position (e.g., a mouse pointer position) within the user interface 900. For example, a portion of a gauge 908-912 or 924-928 may be highlighted, italicized, or otherwise modified based on a client's mouse pointer position. Illustratively, where a client places a mouse pointer within horizontal stripe Y2, corresponding portions of gauges 908-912 may be highlighted, italicized, or otherwise modified in order to emphasis or reflect page-level usage data for the horizontal stripe Y2. Similarly, where a client places a mouse pointer within vertical stripe X5, corresponding portions of gauges 924-928 may be modified in order to emphasis or reflect page-level usage data for the vertical stripe X5. In one embodiment, such modification may include the display of a data indicator (e.g., showing specific page-level usage data for corresponding portions). Accordingly, a user may view page-level usage data for specific portions of the display page 300 may placing a mouse pointer within the specific portion.

As described above, in some embodiments, page-level usage data may be generated which corresponds to multiple content items. Accordingly, while the user interface 900 is described above with respect to a single content item, in some embodiments, the user interface 900 may include page-level usage data corresponding to multiple content items. For example, the graphs 902-906 and gauges 908-912 may be modified to display page-level usage data corresponding to client interactions with all content items within a specific content category (e.g., all sizes or variants of a certain product or service, all "book" content pages, all "clothing" content pages, etc.).

Though illustrative display elements are described above, additional or alternative display elements may be included within the user interface 900 without departing from the scope of the present disclosure. For example, in one embodiment, a display element (not shown in FIG. 9) may be included enabling a viewing client computing device 102 to modify the type of page-level usage data shown. Specifically, as described above, in some embodiments, page-level usage data may be generated based on activities of clients with respect to a content item. Accordingly, the user interface 900 may include a display element selectable to restrict graphs 902-906 and gauges 908-912 to display only page-level usage data corresponding to clients which took a desired action (e.g., who made a purchase or who placed an item in a wish list). Additional display elements may be included to restrict the shown page-level usage data according to other aspects. For example, page-level usage data may be shown which corresponds only to "elite" level clients, only to "non-elite" level clients, etc.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

Various example embodiments of the disclosure can be described by the following clauses:

Clause 1. A computer-implemented method for generating page-level usage data corresponding to interaction with an item of content, the computer-implemented method comprising:
  as implemented by one or more computing devices configured with specific executable instructions,
    transmitting a content item for output on a client computing device;
    receiving, from the client computing device, local interaction information indicating a set of local interaction events implemented on the client computing device;
    generating a replay environment in which to recreate the set of local interaction events;
    for individual local interaction event within the set of local interaction events:
      implementing the individual local interaction event within the replay environment; and
      monitoring the replay environment to determine at least a portion of the content item output during the individual local interaction event;
    based on monitoring the replay environment, generating information indicative of individual portions of the content item output during the set of local interaction events; and
    storing said information as page-level usage data.

Clause 2. The computer-implemented method of Clause 1, wherein the content item corresponds to a web page.

Clause 3. The computer-implemented method of Clause 1, wherein the local interaction information comprises at least one of dimensions of output of the content item on the client computing device, a time of output of the content item on the client computing device, or timing information corresponding to the set of local interaction events.

Clause 4. The computer-implemented method of Clause 1, wherein the set of local interaction events comprises at least one of outputting the content item, scrolling the content item, focusing or defocusing the content item, resizing the content item, or halting output of the content item.

Clause 5. The computer-implemented method of Clause 1, wherein the content item comprises a plurality of horizontal stripes, a horizontal stripe corresponding to a portion of the content item of a specific height.

Clause 6. The computer-implemented method of Clause 1, wherein generating information indicative of individual portions of the content item output during the set of local interaction events comprises generating information indicative of individual horizontal stripes output during the set of local interaction events.

Clause 7. A system for generating usage data regarding client interaction with an item of content, the system comprising:
one or more computing devices configured to:
receive information indicating a set interaction events implemented on a client computing device with respect to a content item;
implement individual interaction events within the received set of interaction events;
monitor implementation of the set of interaction events to determine portions of the content item output during the interaction event; and
based said monitoring, generate information indicative of the portions of the content item output during the set of interaction events.

Clause 8. The system of Clause 7, wherein the received information comprises local interaction information received from the client computing device.

Clause 9. The system of Clause 7, wherein the received information comprises remote interaction information generated based on interaction between the client computing device and a remote computing device.

Clause 10. The system of Clause 7, wherein the one or more computing devices are further configured to transmit the content item to the client computing device.

Clause 11. The system of Clause 7, wherein the one or more computing devices are further configured to generate a replay environment, and wherein implementation of the individual interaction events within the received set of interaction events occurs within the replay environment.

Clause 12. The system of Clause 11, wherein the replay environment includes a web browser application.

Clause 13. The system of Clause 12, wherein the one or more computing devices are configured to generate the replay environment based at least in part on loading the content item into the web browser application.

Clause 14. The system of Clause 7, wherein the generated information comprises an indication of a total time individual portions of the content item were output during the set of interaction events, whether individual portions of the content item were output for at least a threshold amount of time, or a movement speed of the content during output of individual portions of the content item.

Clause 15. The system of Clause 7, wherein the information indicating a set interaction events is generated by the client computing device at least in part by instructions within the content item.

Clause 16. A non-transitory, computer-readable storage medium having computer-executable modules for generating usage data regarding client interaction with an item of content, the computer-executable modules comprising:
an interaction replay module configured to:
receive information indicating a set interaction events implemented on a client computing device;
implement individual interaction events within the received set of interaction events;
monitor implementation of the set of interaction events to determine portions of the content item output during the interaction event; and
based said monitoring, generate information indicative of the portions of the content item output during the set of interaction events.

Clause 17. The non-transitory, computer-readable storage medium of Clause 16, wherein the one or more computing devices are further configured to transmit the content item to the client computing device.

Clause 18. The non-transitory, computer-readable storage medium of Clause 16, wherein the interaction replay module is further configured to generate a replay environment, and wherein implementation of the individual interaction events within the received set of interaction events occurs within the replay environment.

Clause 19. The non-transitory, computer-readable storage medium of Clause 16, wherein the set of interaction events comprises at least one of outputting the content item, scrolling the content item, resizing the content item, focusing or defocusing the content item, or halting output of the content item.

Clause 20. The non-transitory, computer-readable storage medium of Clause 16, wherein the information indicating a set interaction events is generated by the client computing device at least in part by instructions within the content item.

Clause 21. A computer-implemented method for generating usage data regarding client interaction with an item of content, the computer-implemented method comprising:
as implemented by one or more computing devices configured with specific executable instructions,
receiving, from a client computing device, information indicating a set interaction events implemented on the client computing device;
for at least a portion of the interaction events within the received set of interaction events:
implementing the interaction event; and
monitoring implementation of the interaction event to determine at least a portion of the content item output during the interaction event; and
based said monitoring, generating information indicative of individual portions of the content item output during the set of interaction events.

Clause 22. The computer-implemented method of Clause 21, wherein the information includes at least one of dimensions of output of the content item on the client computing device, a time of output of the content item on the client computing device, or timing information corresponding to the set of interaction events.

Clause 23. The computer-implemented method of Clause 21, wherein the generated information comprises an indication of a total time individual portions of the content item were output during the set of interaction events, whether individual portions of the content item were output for at least a threshold amount of time, or a movement speed of the content during output of individual portions of the content item.

Clause 24. The computer-implemented method of Clause 21, wherein the interaction information is generated at least in part by instructions within the content item.

Clause 25. The computer-implemented method of Clause 21, wherein the received information comprises remote interaction information generated based on interaction between the client computing device and a remote computing device.

Clause 26. The computer-implemented method of Clause 21 further comprising transmitting the content item to the client computing device.

Clause 27. The computer-implemented method of Clause 21 further comprising generating a replay environment on which to implement the set of interaction events.

Clause 28. A computer-implemented method for generating page-level usage data corresponding to interaction with an item of content, the computer-implemented method comprising:
as implemented by one or more computing devices configured with specific executable instructions,
receiving usage data indicating an output of the content item on a client computing device during a specified period of time;
determining whether the specified period of time corresponds to a break point, wherein a break point indicates that the usage data should not be combined with historical usage data indicating prior output of the content item on a plurality of client computing devices;
if specified period of time does not correspond to the break point:
receiving the historical usage data;
aggregating the received usage data and the historical usage data to form aggregate usage data; and
storing the aggregate usage data as usage data for the specified period of time; and
if specified period of time corresponds to the break point:
storing the received usage data as usage data for the specified period of time.

Clause 29. The computer-implemented method of Clause 28, wherein the content item corresponds to a web page.

Clause 30. The computer-implemented method of Clause 28, wherein the historical usage data comprises an average time each portion of the content item was output on each of the plurality of client computing devices, a percentage of the plurality of client computing devices that output each portion of the content item for at least a threshold amount of time, or an average output movement speed of the plurality of computing devices during output of each portion of the content item.

Clause 31. The computer-implemented method of Clause 28, wherein break points occur at least one of once a day, once a week, or once a month.

Clause 32. The computer-implemented method of Clause 28, wherein the usage data comprises information regarding portions of the content item output on the plurality of client computing devices.

Clause 33. The computer-implemented method of Clause 32, wherein each of portion of the content item corresponds to at least one of a horizontal portion of the content item of a predefined height or a vertical portion of the content item of a predefined width.

Clause 34. The computer-implemented method of Clause 28 further comprising:
receiving a request for usage data indicating output of the content item between a first point in time and a second point in time;
determining a set of break points between the first point in time and the second point in time;
determining usage data indicating output of the content item between a first point in time and a second point in time based at least in part on the determined set of breakpoints; and
transmitting the determined usage data for output to a client computing device.

Clause 35. A system for generating page-level usage data corresponding to interaction with an item of content, the system comprising:
one or more usage data stores for maintaining historical usage data indicating prior output of a content item on a plurality of client computing devices;
one or more computing devices configured to:
receive additional usage data indicating an output of the content item on an additional client computing device during a specified period of time;
determine that the specified period of time corresponds to a break point indicating that the additional usage data should not be combined with the historical usage data;
if specified period of time does not correspond to break point:
aggregate the additional usage data and the historical usage data to form aggregate usage data; and
store the aggregate usage data as usage data for the specified period of time; and
if specified period of time corresponds to break point:
store the additional usage data as usage data for the specified period of time.

Clause 36. The system of Clause 35, wherein the content item corresponds to a web page.

Clause 37. The system of Clause 35, wherein the historical usage data comprises an average time each portion of the content item was output on each of the plurality of client computing devices, a percentage of the plurality of client computing devices that output each portion of the content item for at least a threshold amount of time, or an average output movement speed of the plurality of computing devices during output of each portion of the content item.

Clause 38. The system of Clause 35, wherein break points correspond to a first day within each month.

Clause 39. The system of Clause 35, wherein the usage data comprises information regarding portions of the content item output on the plurality of client computing devices.

Clause 40. The system of Clause 39, wherein each of portion of the content item corresponds to a horizontal portion of the content item of a predefined height.

Clause 41. The system of Clause 35, wherein the one or more computing devices are further configured to:
receive a request for usage data indicating output of the content item between a first point in time and a second point in time;
determine a set of break points between the first point in time and the second point in time;
determine usage data indicating output of the content item between a first point in time and a second point in time based at least in part on the determined set of breakpoints; and
transmit the determined usage data for output to a client computing device.

Clause 42. A non-transitory, computer-readable storage medium having computer-executable modules for generating page-level usage data corresponding to interaction with an item of content, the computer-executable modules comprising:
- a usage data processing module configured to:
  - receive usage data indicating an output of a content item on a client computing device during a specified period of time;
  - determine that the specified period of time does not correspond to a break point, wherein a break point indicates that the received usage data should not be combined with historical usage data corresponding to prior output of the content item on a plurality of client computing devices; and
  - in response to said determination:
    - aggregate the usage data and the historical usage data to form aggregate usage data; and
    - store the aggregate usage data as usage data for the specified period of time.

Clause 43. The non-transitory, computer-readable storage medium of Clause 42, wherein the content item corresponds to a web page.

Clause 44. The non-transitory, computer-readable storage medium of Clause 42, wherein the historical usage data comprises an average time each portion of the content item was output on each of the plurality of client computing devices, a percentage of the plurality of client computing devices that output each portion of the content item for at least a threshold amount of time, or an average output movement speed of the plurality of computing devices during output of each portion of the content item.

Clause 45. The non-transitory, computer-readable storage medium of Clause 42, wherein break points correspond to a first day within each month.

Clause 46. The non-transitory, computer-readable storage medium of Clause 42, wherein the usage data comprises information regarding portions of the content item output on the plurality of client computing devices.

Clause 47. The non-transitory, computer-readable storage medium of Clause 46, wherein each of portion of the content item corresponds to a horizontal portion of the content item of a predefined height.

Clause 48. The non-transitory, computer-readable storage medium of Clause 42, wherein the one or more computing devices are further configured to:
- receive a request for usage data indicating output of the content item between a first point in time and a second point in time;
- determine a set of break points between the first point in time and the second point in time;
- determine usage data indicating output of the content item between a first point in time and a second point in time based at least in part on the determined set of breakpoints; and
- transmit the determined usage data for output to a client computing device.

Clause 49. A computer-implemented method for outputting page-level usage data corresponding to an item of content, the computer-implemented method comprising:
- as implemented by one or more computing devices configured with specific executable instructions,
  - receiving a request for a content item from a client computing device, the content item comprising a plurality of content portions;
  - generating, for output on the client computing device, a modified content item, the modified content item comprising:
    - the plurality of content portions; and
    - for individual content portions, usage data indicating a historical output of the individual content portion on a plurality of client computing devices;
    - wherein, when output by the client computing device, the modified content item displays individual content portions in conjunction with corresponding usage data of the individual content portions; and
  - transmitting the modified content item to the client computing device for display.

Clause 50. The computer-implemented method of Clause 49, wherein the usage data indicating a historical output of the individual content portions on a plurality of client computing devices comprises at least one of an average time the individual content portions were output on the plurality of client computing devices, a percentage of the plurality of client computing devices that output the individual content portions for at least a threshold amount of time, or an average output movement speed of the plurality of computing devices during output of the individual content portions.

Clause 51. The computer-implemented method of Clause 49, wherein the historical output of the individual content portions corresponds to output of the individual content portions during a defined range of time.

Clause 52. The computer-implemented method of Clause 49, wherein the individual content portions correspond to at least one of a horizontal portion of the content item of a predefined height or a vertical portion of the content item of a predefined width.

Clause 53. The computer-implemented method of Clause 49, wherein the usage data indicating a historical output of the individual content portions on a plurality of client computing devices is displayed alongside the corresponding individual content portion.

Clause 54. The computer-implemented method of Clause 49, wherein the usage data indicating a historical output of the individual content portion on a plurality of client computing devices is displayed at least partially overlapping the corresponding individual content portion.

Clause 55. A system for outputting page-level usage data corresponding to an item of content, the system comprising:
- one or more computing devices configured to:
  - in response to reception of a request for usage data corresponding to a content item comprising a plurality of content portions, generate a modified content item for output on a client computing device, the modified content item comprising:
    - the plurality of content portions; and
    - for individual content portions, usage data indicating historical output of the individual content portions on a plurality of client computing devices;
    - wherein, when output by the client computing device, the modified content item presents individual content portions in conjunction with corresponding usage data of the individual content portions; and transmit the modified content item to the client computing device for presentation.

Clause 56. The system of Clause 55, wherein the historical output of the individual content portions corresponds to output of the individual content portions during a defined range of time.

Clause 57. The system of Clause 56, wherein at least a portion of the modified content item, when output by the client computing device, is selectable to modify the defined range or time.

Clause 58. The system of Clause 55, wherein modified content item further includes an indication of an average size of the historical output of the content item by the plurality of client computing devices.

Clause 59. The system of Clause 55, wherein the usage data indicating a historical output of the individual content portions on a plurality of client computing devices is presented alongside the corresponding individual content portion.

Clause 60. The system of Clause 55, wherein the usage data indicating a historical output of individual content portions on a plurality of client computing devices is presented within a gauge.

Clause 61. The system of Clause 60, wherein the gauge is selectable to display additional data regarding historical output of the individual content portions.

Clause 62. The system of Clause 55, wherein the modified content item further includes one or more graphs reflecting a historical output of the plurality of content portions.

Clause 63. The system of Clause 55, wherein the plurality of client computing devices is determined based at least in part on an action taken with respect to the content item by individual client computing devices of the plurality of computing devices.

Clause 64. A non-transitory, computer-readable storage medium having computer-executable modules for outputting page-level usage data corresponding to an item of content, the computer-executable modules comprising:
a content generation module configured to:
in response to reception of a request for usage data corresponding to a content item comprising a plurality of content portions, generate a modified content item for output on a client computing device, the modified content item comprising:
the plurality of content portions; and
for individual content portions, usage data indicating a historical output of the individual content portions on a plurality of client computing devices;
wherein, when output by the client computing device, the modified content item presents individual content portions in conjunction with corresponding usage data of the individual content portions; and
transmit the modified content item to the client computing device for presentation.

Clause 65. The non-transitory, computer-readable storage medium of Clause 64, wherein the historical output of the individual content portions corresponds to output of the individual content portions during a defined range of time.

Clause 66. The non-transitory, computer-readable storage medium of Clause 65, wherein at least a portion of the modified content item, when output by the client computing device, is selectable to modify the defined range of time.

Clause 67. The non-transitory, computer-readable storage medium of Clause 64, wherein the individual content portions corresponds to at least one of a horizontal portion of the content item of a predefined height or a vertical portion of the content item of a predefined width.

Clause 68. The non-transitory, computer-readable storage medium of Clause 64, wherein the usage data indicating a historical output of individual content portions on a plurality of client computing devices is presented at least partially overlapping the individual content portions.

Clause 69. The non-transitory, computer-readable storage medium of Clause 64, wherein the content item corresponds to a category of content items, and wherein the usage data for individual content portions further indicates a historical output of associated content portions within one or more additional content items corresponding to the category of content items.

Clause 70. A system for outputting page-level usage data corresponding to an item of content, the system comprising:
one or more computing devices configured to:
receive a content item comprising a plurality of content portions and usage data indicating a historical output of the plurality of content portions on a plurality of client computing devices;
generate a user interface for presentation, the user interface comprising:
individual content portions of the plurality of content portions; and
corresponding to the individual content portions, a subset of the usage data indicating a historical output of the individual content portions; and
output the user interface for presentation.

Clause 71. The system of Clause 70, wherein the one or more computing devices are further configured to present an average size of the content item as output by the plurality of client computing devices.

Clause 72. The system of Clause 70, wherein the historical output of the individual content portion corresponds to output of the individual content portions during a defined range of time.

Clause 73. The system of Clause 72, wherein the one or more computing devices are further configured to receive a modified range of time and modify the user interface to reflect a historical output of individual content portions by the plurality of computing devices during the modified range of time.

Clause 74. The system of Clause 70, wherein the usage data indicating a historical output of individual content portions on a plurality of client computing devices is presented alongside the individual content portions.

Clause 75. The system of Clause 70, wherein at least one subset of the usage data is modified based at least in part on a position of a client input device within the user interface.

Clause 76. A computer-implemented method for generating page-level usage data corresponding to interaction with an item of content, the computer-implemented method comprising:
as implemented by one or more computing devices configured with specific executable instructions, receiving a content item corresponding to an item of content presented for display on a client computing device;

determining a plurality of content portions within the content item, wherein individual content portions of the plurality of content portions correspond to a portion of the content item spanning an entire width of the content item and a predefined portion of a height of the content item;

determining interaction information corresponding to client interaction with the content item;

for the individual content portions of the plurality of content portions, determining, based at least in part on the interaction information, usage data indicating output of the individual content portions on the client computing device; and transmitting the usage data corresponding to the individual content portions for storage as page-level usage data for the content item.

Clause 77. The computer-implemented method of Clause 76, wherein the content item is a web page.

Clause 78. The computer-implemented method of Clause 76, wherein the interaction information comprises at least one of dimensions of output of the content item on the client computing device, a time of output of the content item on the client computing device, a set of interaction events modifying output of the content item, timing information corresponding to a set of interaction events, or outputting the content item.

Clause 79. The computer-implemented method of Clause 78, wherein the set of interaction events comprises at least one of scrolling the content item, resizing the content item, focusing or defocusing the content item, or halting output of the content item.

Clause 80. The computer-implemented method of Clause 76, wherein the predefined portion of the height of the content item corresponds to a predefined number of pixels.

Clause 81. The computer-implemented method of Clause 76, wherein the usage data indicating output of the individual content portions on the client computing device comprises at least one of an total time the individual content portions were output on the client computing device, whether the client computing device output the individual content portions for at least a threshold amount of time, or an average movement speed of content item during output of the individual content portions.

Clause 82. The computer-implemented method of Clause 76, wherein the method is implemented by the client computing device.

Clause 83. The computer-implemented method of Clause 76, wherein the method is implemented by a computing device distinct from the client computing device.

Clause 84. A system for generating page-level usage data corresponding to interaction with an item of content, the system comprising:
one or more computing devices configured to:
receive a content item;
determine a plurality of content portions within the content item, wherein individual content portions corresponds to a portion of the content item of predefined dimensions;
determine interaction information corresponding to client interaction with the content item;
for the individual content portions of the plurality of content portions, determine usage data indicating output of the individual content portions based at least in part on the interaction information; and
transmit the usage data corresponding to the individual content portions.

Clause 85. The system of Clause 84, wherein the usage data corresponding to the individual content portions is stored as page-level usage data for the content item.

Clause 86. The system of Clause 84, wherein the interaction information comprises at least one of dimensions of output of the content item on the client computing device, a time of output of the content item on the client computing device, a set of interaction events modifying output of the content item, timing information corresponding to a set of interaction events, or outputting the content item.

Clause 87. The system of Clause 86, wherein the set of interaction events comprises at least one of scrolling the content item, resizing the content item, or halting output of the content item.

Clause 88. The system of Clause 84, wherein the predefined dimensions comprise a predefined number of pixels in at least one dimension.

Clause 89. The system of Clause 84, wherein the usage data indicating output of the individual content portions on the client computing device comprises at least one of an total time the individual content portions were output on the client computing device, whether the client computing device output the individual content portions for at least a threshold amount of time, or an average movement speed of content item during output of the individual content portions.

Clause 90. The system of Clause 84, wherein the one or more computing devices comprise the client computing device.

Clause 91. The system of Clause 84, wherein the one or more computing devices comprise a computing device distinct from the client computing device.

Clause 92. A non-transitory, computer-readable storage medium containing computer-executable modules for generating page-level usage data corresponding to interaction with an item of content, the computer-executable modules comprising:
an usage data management module configured to:
determine a plurality of content portions within a content item, wherein individual content portions corresponds to a portion of the content item of a predefined height or width;
determine interaction information corresponding to client interaction with the content item;
for the individual content portions of the plurality of content portions, determine usage data indicating output of the individual content portions based at least in part on the interaction information; and
transmit the usage data corresponding to the individual content portions.

Clause 93. The non-transitory, computer-readable storage medium of Clause 92, wherein the usage data corresponding to the individual content portions is stored as page-level usage data for the content item.

Clause 94. The non-transitory, computer-readable storage medium of Clause 92, wherein the interaction information comprises at least one of dimensions of output of the content item on the client computing device, a time of output of the content item on the client computing device, a set of interaction events modifying output of the content item, timing information corresponding to a set of interaction events, or outputting the content item.

Clause 95. The non-transitory, computer-readable storage medium of Clause 94, wherein the set of interaction events comprises at least one of scrolling the content item, resizing the content item, or halting output of the content item.

Clause 96. The non-transitory, computer-readable storage medium of Clause 92, wherein the predefined height or width corresponds to a predefined number of pixels.

Clause 97. The non-transitory, computer-readable storage medium of Clause 92, wherein the usage data indicating output of the content portion on the client computing device comprises at least one of an total time the individual content portions were output on the client computing device, whether the client computing device output the individual content portions for at least a threshold amount of time, or an average movement speed of content item during output of the individual content portions.

What is claimed is:

1. A computer-implemented method for generating page-level usage data corresponding to interaction with an item of content, the computer-implemented method comprising:
as implemented by one or more computing devices configured with specific executable instructions,
receiving a content item corresponding to an item of content presented for display on a client computing device;
determining a plurality of content portions within the content item, wherein individual content portions of the plurality of content portions are determined independently from displayable elements within the content item, and wherein the individual content portions of the plurality of content portions correspond to a portion of the content item spanning an entire width of the content item and a predefined portion of a height of the content item;
determining local interaction information corresponding to client interaction with the content item, the local interaction information indicating a set of interaction events implemented locally on the client computing device, during output of the content item, to modify the output of the content item on the client computing device;
using at least the interaction information to determine usage data indicating which of the individual content portions, as determined independently from displayable elements within the content item, were output on the client computing device, wherein the usage data indicates a timing of output of the individual content portions on the client computing device; and
transmitting the usage data corresponding to the individual content portions for storage as page-level usage data for the content item.

2. The computer-implemented method of claim 1, wherein the content item is a web page.

3. The computer-implemented method of claim 1, wherein the local interaction information further indicates at least one of dimensions of output of the content item on the client computing device, a time of output of the content item on the client computing device, timing information corresponding to a set of interaction events, or outputting the content item.

4. The computer-implemented method of claim 1, wherein the set of interaction events comprises at least one of scrolling the content item, resizing the content item, focusing or defocusing the content item, or halting output of the content item.

5. The computer-implemented method of claim 1, wherein the predefined portion of the height of the content item corresponds to a predefined number of pixels.

6. The computer-implemented method of claim 1, wherein the usage data indicating a timing of output of the individual content portions on the client computing device comprises at least one of an total time the individual content portions were output on the client computing device, whether the client computing device output the individual content portions for at least a threshold amount of time, or an average movement speed of content item during output of the individual content portions.

7. The computer-implemented method of claim 1, wherein the method is implemented by the client computing device.

8. The computer-implemented method of claim 1, wherein the method is implemented by a computing device distinct from the client computing device.

9. A system for generating page-level usage data corresponding to interaction with an item of content, the system comprising:
one or more computing devices configured to:
receive a content item;
determine a plurality of content portions within the content item, wherein individual content portions are determined independently from displayable elements within the content item, and wherein the individual content portions correspond to a portion of the content item of predefined dimensions;
determine local interaction information corresponding to client interaction with the content item, the local interaction information indicating a set of interaction events implemented locally on a client computing device, during output of the content item, to modify the output of the content item on the client computing device;
use at least the interaction information to determine usage data indicating which of the individual content portions, as determined independently from displayable elements within the content item, were output on the client computing device, wherein the usage data indicates a timing of output of the individual content portions on the client computing device; and
transmit the usage data corresponding to the individual content portions.

10. The system of claim 9, wherein the usage data corresponding to the individual content portions is stored as page-level usage data for the content item.

11. The system of claim 9, wherein the local interaction information further indicates at least one of dimensions of output of the content item on the client computing device, a time of output of the content item on the client computing device, timing information corresponding to a set of interaction events, or outputting the content item.

12. The system of claim 11, wherein the set of interaction events comprises at least one of scrolling the content item, resizing the content item, or halting output of the content item.

13. The system of claim 9, wherein the predefined dimensions comprise a predefined number of pixels in at least one dimension.

14. The system of claim 9, wherein the usage data indicating a timing of output of the individual content portions on the client computing device comprises at least one of an total time the individual content portions were output on the client computing device, whether the client computing device output the individual content portions for at least a threshold amount of time, or an average movement speed of content item during output of the individual content portions.

15. The system of claim 9, wherein the one or more computing devices comprise the client computing device.

16. The system of claim 9, wherein the one or more computing devices comprise a computing device distinct from the client computing device.

17. A non-transitory, computer-readable storage medium containing computer-executable modules for generating page-level usage data corresponding to interaction with an item of content, the computer-executable modules comprising:
   an usage data management module configured to:
      determine a plurality of content portions within a content item, wherein individual content portions are determined independently from displayable elements within the content item, and wherein the individual content portions correspond to a portion of the content item of a predefined height or width;
      determine local interaction information corresponding to client interaction with the content item, the local interaction information indicating a set of interaction events implemented locally on a client computing device, during output of the content item, to modify the output of the content item on the client computing device;
      use at least the interaction information to determine usage data indicating which of the individual content portions, as determined independently from displayable elements within the content item, were output on the client computing device, wherein the usage data indicates a timing of output of the individual content portions on the client computing device; and
      transmit the usage data corresponding to the individual content portions.

18. The non-transitory, computer-readable storage medium of claim 17, wherein the usage data corresponding to the individual content portions is stored as page-level usage data for the content item.

19. The non-transitory, computer-readable storage medium of claim 17, wherein the local interaction information further indicates at least one of dimensions of output of the content item on the client computing device, a time of output of the content item on the client computing device, a timing information corresponding to a set of interaction events, or outputting the content item.

20. The non-transitory, computer-readable storage medium of claim 19, wherein the set of local interaction events comprises at least one of scrolling the content item, resizing the content item, or halting output of the content item.

21. The non-transitory, computer-readable storage medium of claim 17, wherein the predefined height or width corresponds to a predefined number of pixels.

22. The non-transitory, computer-readable storage medium of claim 17, wherein the usage data indicating a timing of output of the content portion on the client computing device comprises at least one of an total time the individual content portions were output on the client computing device, whether the client computing device output the individual content portions for at least a threshold amount of time, or an average movement speed of content item during output of the individual content portions.

* * * * *